United States Patent
Taguchi et al.

(10) Patent No.: US 6,871,903 B2
(45) Date of Patent: Mar. 29, 2005

(54) STRUCTURAL ELEMENT AND BODY STRUCTURE INCLUDING THE SAME

(75) Inventors: Makoto Taguchi, Kobe (JP); Toshiyuki Hirashima, Kobe (JP); Seiichiro Yagi, Kobe (JP); Kouichi Matsumoto, Himeji (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/352,221

(22) Filed: Jan. 28, 2003

(65) Prior Publication Data

US 2004/0145215 A1 Jul. 29, 2004

(51) Int. Cl.⁷ .............................................. B62D 33/00
(52) U.S. Cl. .................... 296/181.6; 296/191; 105/396; 105/397; 52/17
(58) Field of Search ........................ 296/181.6, 187.02, 296/191, 39.3; 220/1.5; 105/396, 397, 401, 404; 52/17, 45; 104/397, 401

(56) References Cited

U.S. PATENT DOCUMENTS

| | | | | |
|---|---|---|---|---|
| 3,393,920 A | * | 7/1968 | Ehrlich .................... | 296/181.6 |
| 3,746,388 A | * | 7/1973 | Robinson ................. | 296/181.6 |
| 4,974,900 A | * | 12/1990 | Destefani et al. ........ | 296/181.6 |
| 5,140,913 A | * | 8/1992 | Takeichi et al. ............ | 105/397 |
| 5,433,151 A | * | 7/1995 | Ohara et al. ................ | 105/397 |
| 5,741,042 A | * | 4/1998 | Livingston et al. .... | 296/203.01 |
| 5,849,122 A | * | 12/1998 | Kenmochi et al. .......... | 156/182 |

FOREIGN PATENT DOCUMENTS

| | | |
|---|---|---|
| JP | A 61-220962 | 10/1986 |
| JP | A 03-243459 | 10/1991 |
| JP | B1 3015020 | 12/1999 |

* cited by examiner

Primary Examiner—Joseph D. Pape
(74) Attorney, Agent, or Firm—Oliff & Berridge, PLC

(57) ABSTRACT

A side structure included in a railroad car is provided with an window opening, and door openings formed on the longitudinally opposite sides of the window opening, respectively. The side structure excluding parts corresponding to the window opening and the door openings are divided into a plurality of sections. A first section extends vertically between the window opening and the door opening, a second section extends vertically between the window opening and the door opening, and a third section of a width substantially equal to that of the window opening extends under the window opening. Each of the sections has a core attached to the inner surface of an outer panel, and rim members having a substantially Z-shaped cross section and surround the core. An inner panel is attached to the core and the rim members so as to cover the inner surface of the core.

11 Claims, 37 Drawing Sheets

BUCKLING COEFFICIENT K (COMPRESSIVE BUCKLING)

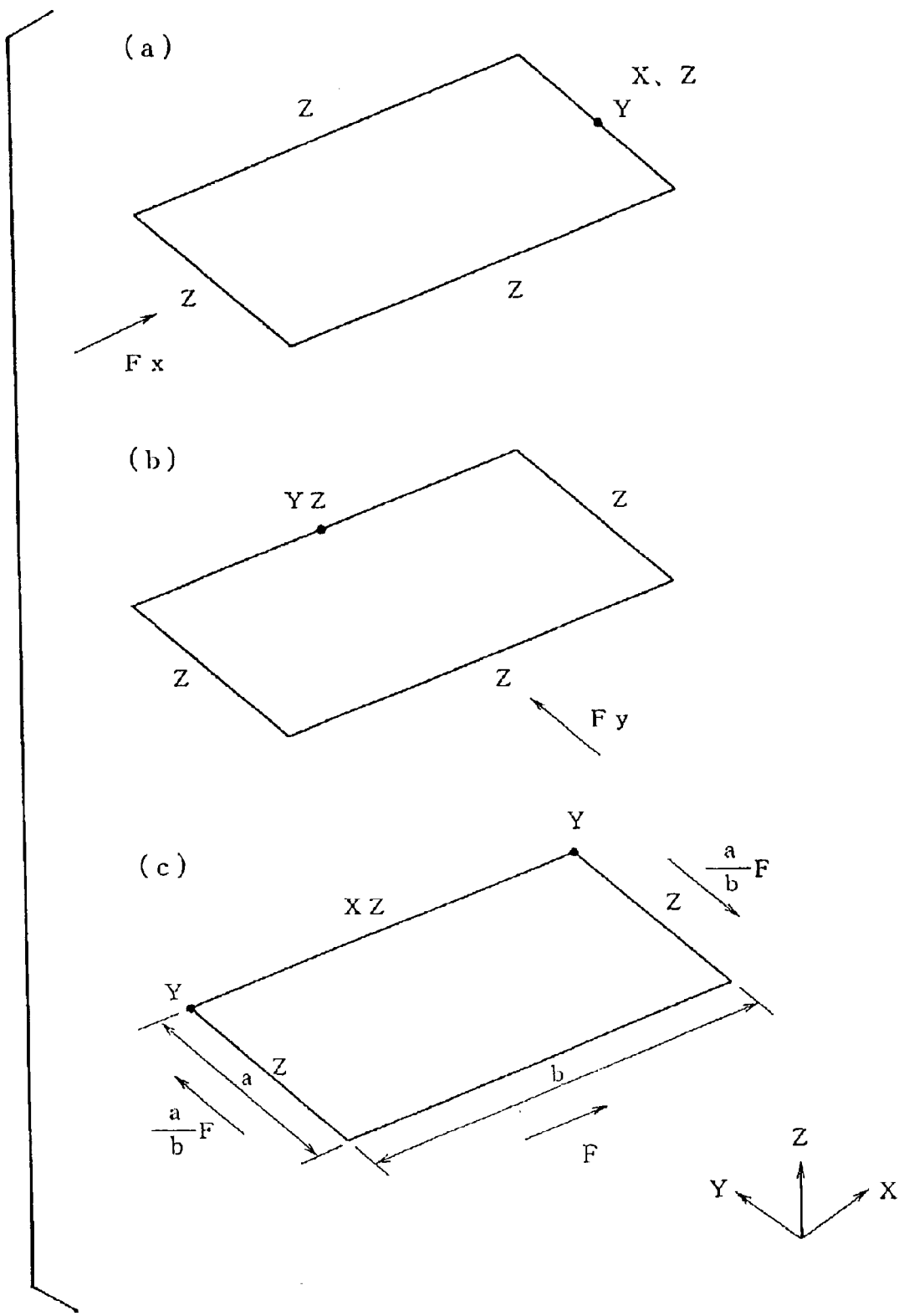
F I G. 10

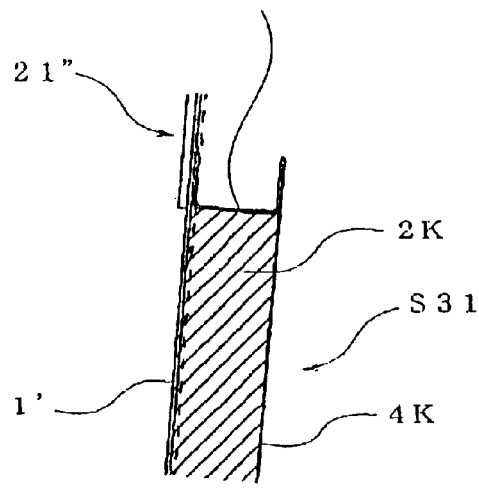
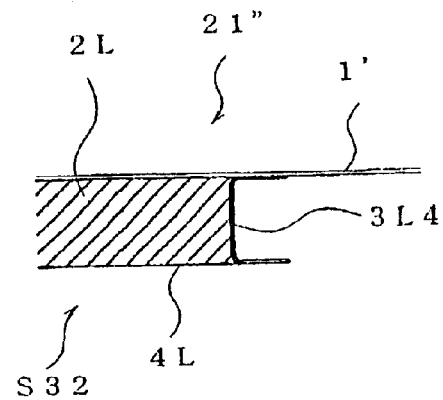
FIG. 40   FIG. 41
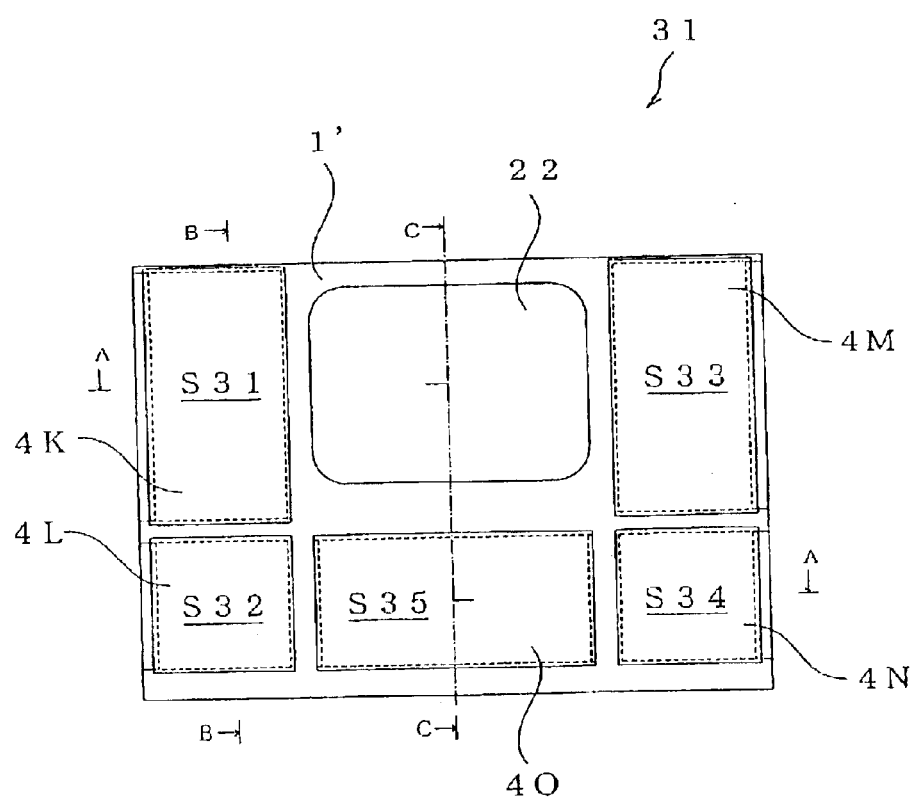
FIG. 42

106H

W4

106I

106H

W3

106J

W6

106I

US 6,871,903 B2

STRUCTURAL ELEMENT AND BODY STRUCTURE INCLUDING THE SAME

TECHNICAL FIELD

The present invention relates to a structural element and a body structure including the structural element.

BACKGROUND ART

FIGS. 50 to 52 show an outer panel for a side structure of a conventional railroad car. An outer panel 101 (side structure) is provided with an window opening 102, and is provided with door pocket parts 107 and 108 and door openings 103 and 104 arranged at fixed intervals on the opposite sides of the window opening 102, respectively. The door pocket parts 107 and 108 are provided with reinforcing members 105A and 105B provided with vertical members 105a having a substantially U-shaped cross section, and fixed in place by welding. Second reinforcing members 105C and 105D provided with vertical members 105b having a substantially U-shaped cross section are disposed in upper parts (parts at a height corresponding to the height of the window opening 102) of a part between the first reinforcing member 105A and the window opening 102 and a part between the first reinforcing member 105B and the window opening 102, respectively.

Three parallel third reinforcing members 105E to 105G having a substantially hat-shaped cross section are extended longitudinally in a lower part, extending under the window opening 102, of a part extending between the first reinforcing members 105A and 105B. Two vertical fourth reinforcing members 106A and 106B having a substantially Z-shaped cross section are extended perpendicularly to the third reinforcing members 105E through 105G in the lower part extending under the window opening 102. Side posts 106C and 106D, i.e., rim members, having a substantially Z-shaped cross section and a height greater than that of the fourth reinforcing members 106A and 106B are set on the opposite sides of the window opening 102, respectively. A fifth reinforcing member 106E having a substantially Z-shaped cross section is extended longitudinally under the window opening 102 and above the third reinforcing members 105E to 105G. Vertical door posts 106F and 106G having a substantially Z-shaped cross section are set vertically on the opposite sides of each of the door openings 103 and 104.

The side posts 106C and 106D are welded to a part between the one of the opposite sides of the window opening 102 and the door pocket part 107 and a part between the other side of the window opening 102 and the door pocket part 108, respectively, of the outer panel 101, and the door posts 106F and 106G are welded to a part between the door pocket part 107 and the door opening 103 and a part between the door pocket 108 and the door opening 104, respectively, of the outer panel 101.

Those frame members including the side posts and the door posts maintain the shape of the side structure, and the plurality of reinforcing members maintain the shapes of parts, between the frame members, of the outer panel.

Those reinforcing members 105A to 105G, 106A, 106B and 106E are welded to the outer panel 101 to secure the buckling strength of the outer panel 101 of the body structure of the car. Various body structures have been proposed.

(1) A side structure of an electric passenger car proposed in JP61-220962A is constructed by welding corrugated reinforcing plates to the inner surface of a side outer plate, and filling up spaces between the reinforcing plate and the side outer plate with a core material.

(2) A side structure proposed in Japanese Patent No. 3015020 is formed by processing a stainless steel double-skin panel having outer and inner panels each serving as a load-bearing member. The outer and the inner panel have substantially the same thickness and are formed of the same material. This side structure is provided with core members formed by bending a stainless steel plate.

To fabricate the side structure mentioned in JP61-220962A, reinforcing plates of different sizes respectively corresponding to those of regions to be reinforced of the side outer panel need to be made, which requires troublesome processes because the reinforcing plates are corrugated. Since welding amount necessary for welding the reinforcing plates to the outer panel of a side structure is the same as that necessary for constructing a conventional frame-skin structure, the prior art body structure has no effect on reducing welding distortion. In filling up the spaces with a filling material (core material), the reinforcing plates need to have a thickness sufficient to withstand pressure due to the foaming of the filling material. Consequently, the weight of the reinforcing plates and the filling material is greater than that of a conventional buckling-preventing reinforced structure.

The technique mentioned in Japanese Patent No. 3015020 uses both the outer and the inner panel for bearing load. Therefore, the inner panel has a thickness substantially equal to that of the outer panel, is a high-strength member formed of the same material as the outer panel, and hence is considerably heavy. In constructing the side structure, it is necessary to bond together not only the outer panels but also the inner panels to bear load by the inner panels as well as the outer panels, which needs complicated welding construction. Spaces between the outer and the inner panel cannot effectively be used for thermal insulation, wiring and piping.

DISCLOSURE OF THE INVENTION

It is an object of the present invention to provide a structural element that enables weight reduction through the reduction of the number of reinforcing members, and the reduction of welding man-hour and welding distortion through the reduction of welding amount, and to provide a body structure employing the structural element.

According to the present invention, a structural element to be combined with other structural members to construct a body structure comprises: an outer panel serving as a structural member; an inner panel respectively having areas smaller than that of the outer panel; a rim member interposed between the outer panel and the inner panel, and joined to the outer and the inner panel; and a core member filling up a space defined by the outer panel, the inner panel and the rim member; wherein the core member lies between the outer panel and the inner panel and is adhesively bonded or fusion welded at least to the outer and the inner panel.

According to the present invention, the rim member joined to the outer and the inner panel is extended along the edge of the inner panel, and the outer panel is supported elastically by filling up the spaces defined by the outer panel, the inner panel and the rim member with the core member (elastic core member). The elastic support of the outer panel enhances the buckling strength of the outer panel and realizes the reduction of members, welding amount and welding distortion.

According to the present invention, the core member is a structural member formed of a plastic foam or wood.

Since the plastic foam and wood have a low density, the body structure can be easily simplified and lightened by properly selecting the pitches of the rim members and the thickness and density of the core member. When a plastic foam capable of serving as a heat-insulating material is used for forming the core member, the space between the outer and the inner panel can be effectively used to provide a heat-insulating effect without using complicated structures.

According to the present invention, the inner panel is a structural member of a fiber-reinforced plastic material or an aluminum alloy, or a stainless steel panel of a thickness not greater than ⅓ of the thickness of the outer panel.

Since the adjacent inner panels are not mechanically connected together and hence most part of load placed on the body structure is born by the outer panel, and the inner panel is loaded scarcely, the inner panel may be a lightweight member (a fiber reinforced plastic member, an aluminum alloy member or a stainless steel panel of a thickness not greater than ⅓ of the thickness of the outer panel).

The use of the lightweight material for forming the inner panel provides an advantageous effect of reducing the weight of the body structure.

According to the present invention, the rim member is a structural member formed of a fiber reinforced plastic material or an aluminum alloy, or a stainless steel plate thinner than the outer panel.

According to the present invention, the outer panel is formed of a metal, such as an aluminum alloy or a stainless steel.

According to the present invention, a body structure comprises: a structural element to be combined with other structural elements, comprising an outer panel serving as a structural member, inner panels respectively having areas smaller than that of the outer panel, rim members interposed between the outer panel and the inner panels, and joined to the outer panel and the inner panels, and core members filling up spaces defined by the outer panel, the inner panels and the rim members, the core members lying between the outer panel and the inner panels, and being adhesively bonded or welded at least to the outer panel and the inner panels; and a frame having reinforcing frame members arranged in the longitudinal and transverse directions; wherein sections of the inner panels of the structural element are placed in openings in the frame element, respectively.

The structural element is used for forming a body structure of a railroad car or the like.

According to the present invention, one of the openings of the frame element of the body structure is not covered with the structural element and is used as a window opening.

According to the present invention, one of the openings of the frame element of the body structure is not covered with the structural element and are used as a doorway opening.

According to the present invention, when the outer panel of the structural element has an outward convex bend, elastic support parts each including the core member, the rim members and the inner panel are arranged separately and are demarcated by the outward convex bend.

Since the core members are thus demarcated by the outward convex bend of the outer panel, the core members, the rim members and the inner panels do not need to be bent and the structural element can be constructed by using flat cores, inner panels and linear rim members. Thus, the body structure is not complicated.

According to the present invention, it is desirable that the distance b between a frame member of the frame element, and a rim member of the structural element adjacent and parallel to the frame member, meets Expression (1).

$$b \le t\sqrt{\frac{\pi^2 E}{3(1-v^2)\sigma_{c1}}} \quad (1)$$

t: Thickness of the outer panel
π: Ratio of the circumference of a circle to its diameter,
E: Young's modulus of the outer panel,
υ: Poisson's ratio of the outer panel, and
$\sigma_{c1}$: Compressive stress parallel to a frame member induced in a part of the outer panel between the frame member and a rim member of the structural element parallel to the frame member, when the body structure is loaded Although only the outer panel of the structural element extends between the frame member of the frame element and the rim member of the structural element, the outer panel secures a necessary buckling strength with respect to a direction parallel to the frame member.

According to the present invention, when the direction of the compressive stress induced in the outer panel is perpendicular to the frame member, it is desirable that the distance b between the frame member of the frame element, and the rim member of the structural element adjacent and parallel to the frame member, meets-Expression (2).

$$b \le t\sqrt{\frac{\pi^2 E}{12\sigma_{c2}}} \quad (2)$$

t: Thickness of the outer panel
π: Ratio of the circumference of a circle to its diameter
E: Young's modulus of the outer panel
v: Poisson's ratio of the outer panel
$\sigma_{c2}$: Compressive stress in a direction perpendicular to a frame member induced in a part of the outer panel between the frame member of the frame element and a rim member of the structural element adjacent and parallel to the frame member, when the body structure is loaded Thus, the outer panel of the structural element extending between the frame member of the frame element and the rim member of the structural element secures a necessary buckling strength with respect to a direction parallel to the frame member.

BRIEF DESCRIPTION OF THE DRAWINGS

FIGS. 10(a), 10(b) and 10(c) are views of assistance in explaining constraining conditions for buckling strength analysis of buckling with respect to an X-direction, buckling with respect to a Y-direction and shear buckling, respectively;

FIG. 40 is an enlarged view of a part E in FIG. 36;

FIG. 41 is an enlarged view of a part F in FIG. 36;

FIG. 42 is a front elevation of a structural element according to the present invention;

BEST MODE FOR CARRYING OUT THE INVENTION

Preferred embodiments of the present invention will be described with reference to the accompanying drawings.

Figure 1:
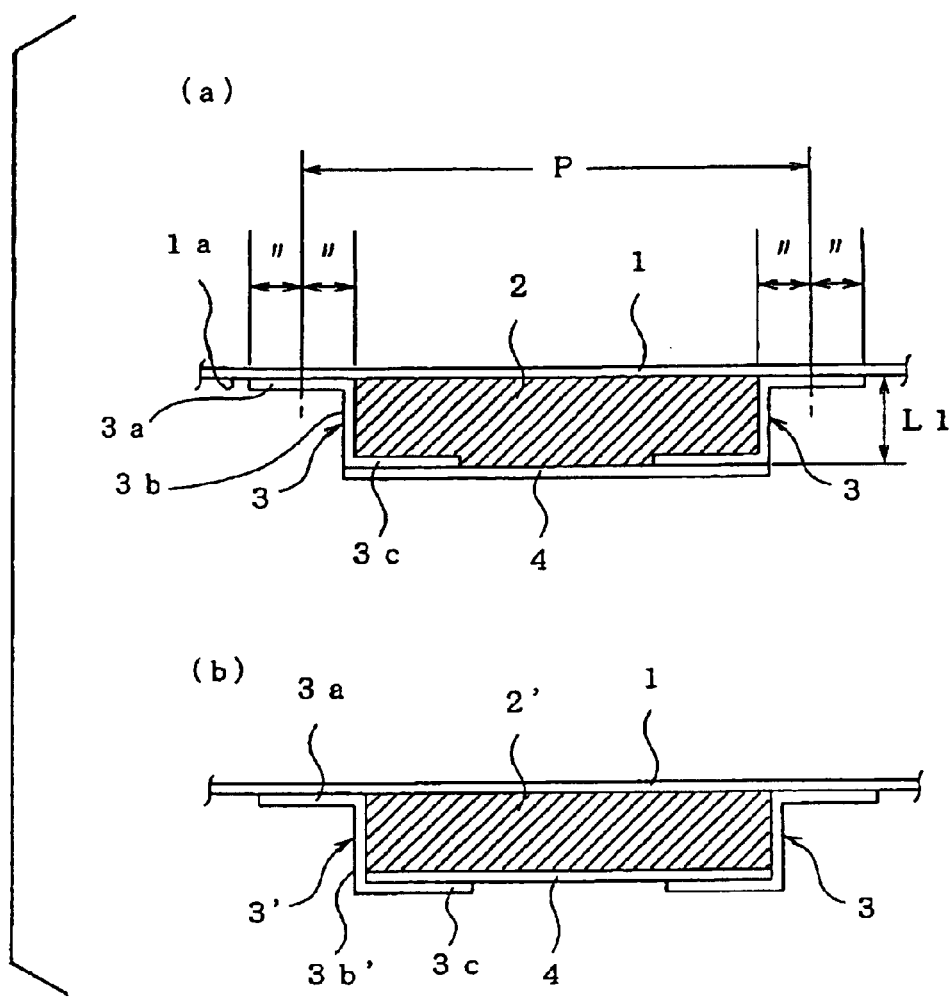
FIGS. 1(a) and 1(b) are schematic views of structural elements according to the present invention.

FIGS. 1(a) and 1(b) are schematic views of a structural element in a preferred embodiment according to the present invention.

Referring to FIG. 1(a), the structural element according to the present invention includes an outer panel 1 forming the longitudinally and vertically extending outer surface of a railroad car, and a core (core member) 2 having a rectangular cross section and adhesively bonded to the inner surface of the outer panel 1. Rim members 3 attached to the outer panel 1 surround the core 2. An inner panel 4 is attached to the rim members 3 and is bonded to the inner surface of the core 2 so as to cover the core 2. The rim members 3 are arranged at pitches P.

The core 2 thus supports the outer panel 1 elastically to enable the outer panel 1 to enhance buckling strength. Since any reinforcements for preventing buckling, which are necessary for the conventional structural element, are not necessary, the number of component members, the amount of welding and welding distortion can be reduced.

The core 2 may be formed of a heat-insulating material, i.e., a soft structural material. The thickness of the core 2 is determined so that the core 2 has a necessary heat-insulating ability. The core 2 maybe formed of a plastic foam, such as a polyurethane foam, a polyvinyl chloride foam, such as KLEGECELL®, a polyethylene foam or a phenol foam.

The specific weight of the core 2 of a plastics foam is in the range of $1/20$ to $1/80$ or below of that of a stainless steel plate forming the outer panel 1. The very light core 2 has an advantageous effect of constructing the structural element in a lightweight structure by selectively properly determining the thickness L1 and the density of the core 2.

The rim members 3 are formed by bending plates, such as stainless steel plates. Each of the rim members 3 has a joining part 3a welded to the inner surface 1a, i.e., a surface on the side of the passenger room, of the outer panel 1, a vertical wall part 3b extending from an edge of the joining part 3a substantially perpendicularly to the joining part 3a, and a holding part 3c extending from an inner edge of the vertical wall part 3b in parallel to the joining part 3a in a direction opposite a direction in which the joining part 3a extends from the outer edge of the wall part 3b. The holding part 3c presses only the core 2 or the core 2 and the inner panel 4 against the outer panel 1.

The joining part 3a of the rim member 3 does not need necessarily welded to the inner surface 1a of the outer panel 1, but may be bonded adhesively to the inner surface 1a of the outer panel 1.

Figure 2:
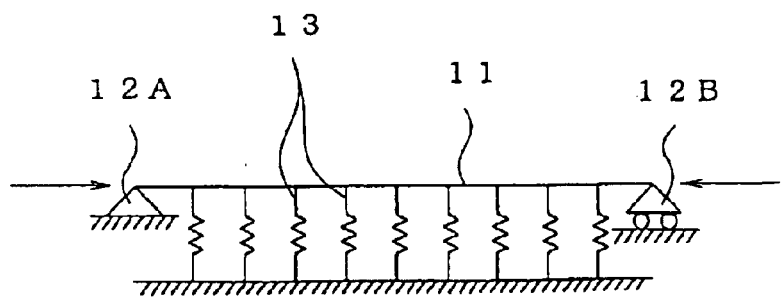
FIG. 2 is a typical view of the structural element (elastic support system) shown in FIG. 1(a)

The structural elements shown in FIGS. 1(a) and 1(b) were modeled by an elastic support system shown in FIG. 2, assuming that the outer panel 1 was a beam 11, the rim members 3 (reinforcing members) were supporting points 12A and 12B, and the core 2 was a plurality of springs 13 to examine the effect of the Young's modulus of the core 2 on the buckling strength of the outer panel 1.

In modeling the structural elements, it was assumed that the rigidity of the inner panel 4 was far higher than that of the core 2, and the inner panel 4 was a rigid member supporting the springs 13.

Expression (3) is a equilibrium equation representing the beam 11 of the model of an elastic support system shown in FIG. 2.

$$EI\frac{d^4y}{dx^4} = -ky \qquad (3)$$

y: Deflection
E: Young's modulus of the beam
I: Geometrical moment of inertia of the beam
k: Spring constant of the elastic support The spring constant k per unit area of the core 2 of the structural element shown in FIGS. 1(a) and 1(b) is represented by Expression (4).

$$k = \frac{E_1}{L_1} \qquad (4)$$

$E_1$: Young's modulus of the elastic member (the core 2)
$L_1$: Effective depth (thickness) of the elastic member (core 2)

Expression (5), which is similar to Expression (1), is a equilibrium equation representing the symmetrical deformation of a cylindrical body.

$$D\frac{d^4y}{dx^4} = -\frac{Et}{r^2}y \qquad (5)$$

D: Flexural rigidity of the plate
t: Thickness of the plate
r: Radius of the cylindrical body
y: Radial displacement of the cylindrical body The flexural rigidity D of the plate in Expression (5) is expressed by Expression (6).

$$D = \frac{Et^3}{12(1-v^2)} \qquad (6)$$

E: Young's modulus of the plate
v: Poisson's ratio

Assuming that Expressions (3) and (5) are equivalent, the following relation can be derived from the respective right sides of Expressions (3) and (5).

$$k = \frac{Et}{r^2} \qquad (7)$$

Assuming that the beam 11 of the elastic support system is the cylindrical body, the equivalent radius r is represented by Expression (8).

$$r = \sqrt{\frac{Et}{k}} = \sqrt{\frac{EtLl}{El}} \qquad (8)$$

It is known that Expression (9) represents the axial compressive buckling stress $\sigma_{cr}$ of a cylindrical body.

$$\sigma_{cr} = \frac{E}{\sqrt{3(1-v^2)}} \cdot \frac{t}{r} \qquad (9)$$

The equivalent radius r in Expression (9) is a function of the spring constant of the elastic support system as represented by Expression (8). Substituting Expression (8) into Expression (9), Expression (10) is obtained.

$$\sigma_{cr} = \frac{E}{\sqrt{3(1-v^2)}} \times \frac{t}{r} = \sqrt{\frac{Etk}{3(1-v^2)}} \qquad (10)$$

Thus, the buckling stress $\sigma_{cr}$ in the elastic support system is proportional to the square root of the spring constant k of the elastic support system.

Incidentally, the necessary buckling strength of the side structure of an ordinary railroad car is on the order of 15 kgf/mm² at the maximum. Therefore, the spring constant k of the elastic support system is:

$$k = \frac{\sigma_{cr}^2 \times 3 \times (1-v^2)}{Et} = \frac{15^2 \times 3 \times (1-0.3^2)}{19700 \times 1.5} = 0.02 \text{ kgf/mm} \qquad (11)$$

E: Young's modulus of stainless steel (19700 kgf/mm²)
v: Poisson's ratio (0.3)
t: Thickness of the plate (1.5 mm)

The Young's modulus $E_1$ of the core of a thickness $L_1$=30 mm is:

$E_1$=k·$L_1$=0.02×30=0.6 kgf/mm².

Since the Young's modulus of the foregoing plastic form is about 1 kgf/mm² or above, the plastic foam generally used as a heat-insulating material can be used for forming the core.

The use of the structural elements of the present invention shown in FIGS. 1(a) and 1(b) in parts, which need buckling strength, of a body structure enhances the buckling strength of body structure.

Figure 8:
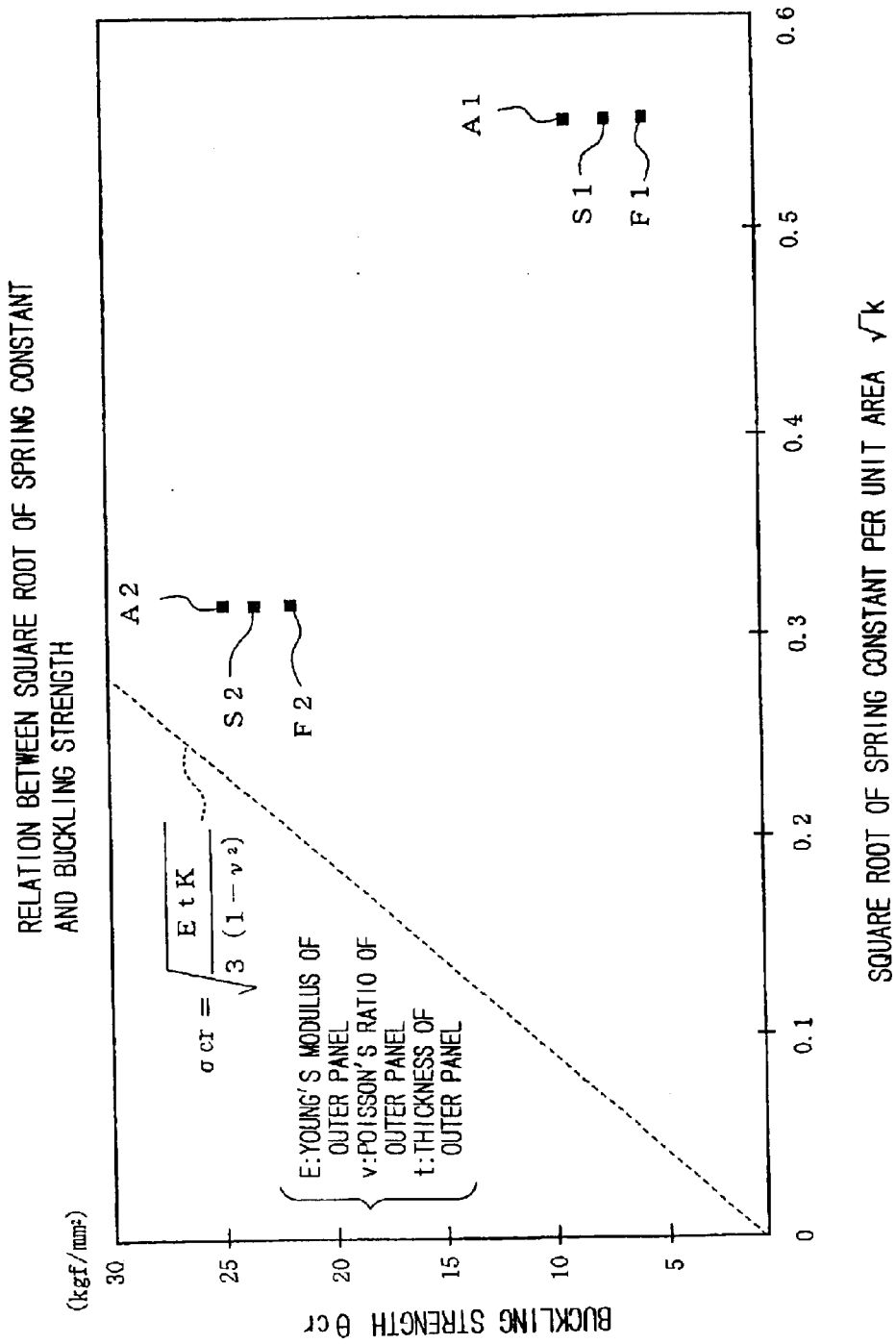
FIG. 8 is a graph showing the relation between the square root of spring constant per unit area and buckling strength.

Buckling strength analysis of structural elements shown in Table 1 was performed using a finite element method, which is a known method of analyzing stresses induced in the body structures of railroad cars, to examine the rigidities of the inner panel and the rim member. A finite element method divided each member into a plurality of meshes, formed a stress analysis model by using each mesh as a plate element (CQUAD4, CTRIA3), applied a predetermined load to the stress analysis model and calculated stress induced in the stress analysis model.

strength is proportional to the square root of the spring constant ($\sqrt{F}$) of the antiplane deflection of the core (refer to broken line in FIG. 8).

Since the core may be formed of a soft material, such as a heat-insulating material, the core has a small density. Therefore, the buckling strength $\sigma_{cr}$ increases remarkably

TABLE 1

| Type | Outer panel | | Elastic core | | Inner panel | |
|---|---|---|---|---|---|---|
| | Material | Thickness | Material | Thickness | Material | Thickness |
| S1 | Stainless steel | 1.5 mm | Plastic foam | 10 mm | Stainless steel | 0.5 mm |
| S2 | Stainless steel | 1.5 mm | Plastic foam | 30 mm | Stainless steel | 0.5 mm |
| A1 | Stainless steel | 1.5 mm | Plastic foam | 10 mm | Aluminum alloy | 1.5 mm |
| A2 | Stainless steel | 1.5 mm | Plastic foam | 30 mm | Aluminum alloy | 1.5 mm |
| F1 | Stainless steel | 1.5 mm | Plastic foam | 10 mm | FRP | 2 mm |
| F2 | Stainless steel | 1.5 mm | Plastic foam | 30 mm | FRP | 2 mm |

Figure 6:
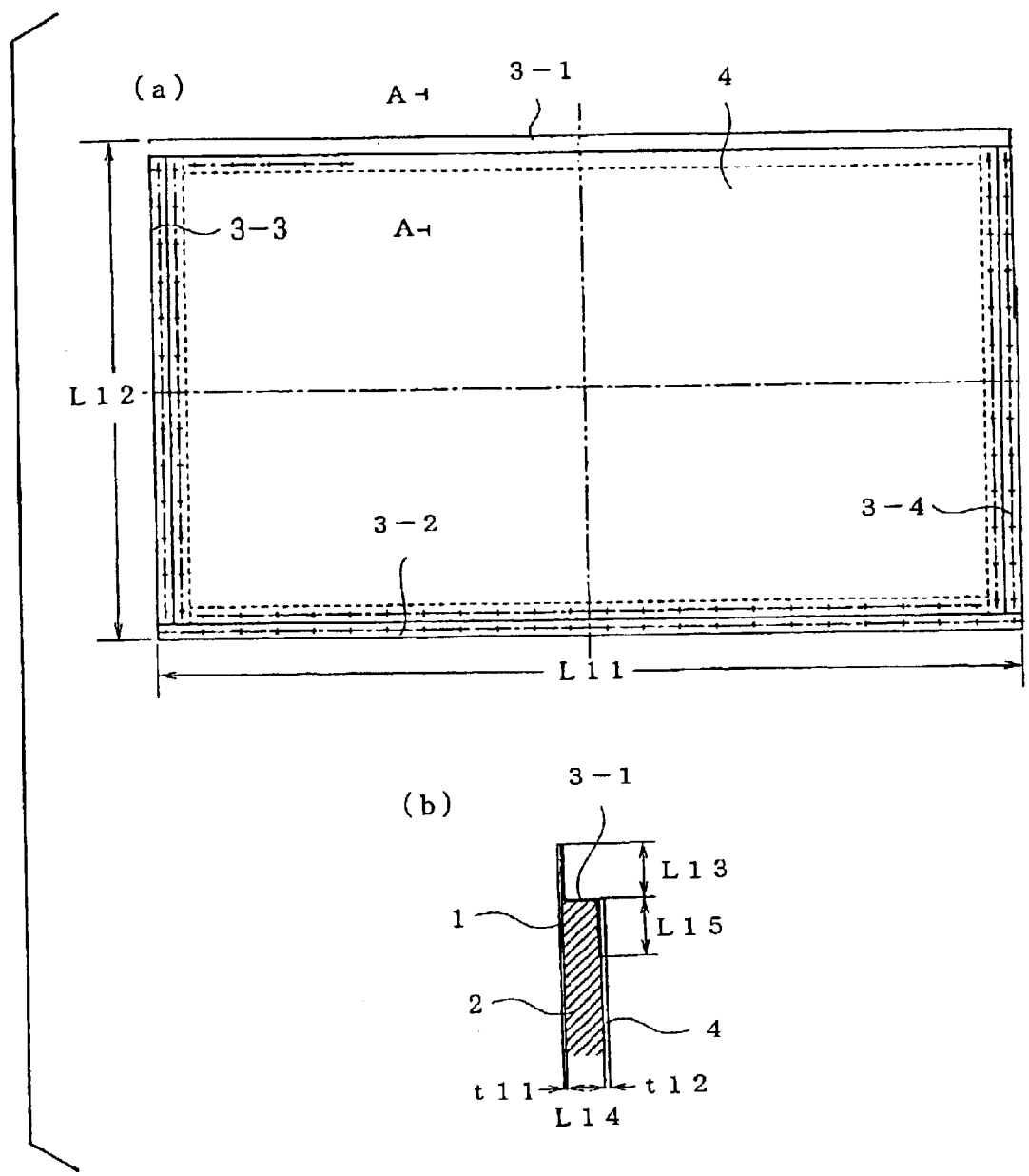
FIG. 6(a) is a front elevation of a structural element employed in buckling strength analysis.
FIG. 6(b) is a sectional view taken on line A—A in FIG. 6(a)

A structural element as shown in FIGS. 6(a) and 6(b) was used as a test sample. The structural element as a test sample was constructed by holding a flat core 2 (30 mm in thickness) of a plastic foam by four rim members 3-1 to 3-4 each having a joining part of $L_{13}$=24 mm, a vertical wall part of $L_{14}$=30 mm and a holding part of $L_{15}$=25 mm, adhesively bonding the core 2 to an outer plate 1 of $L_{11}$=1290 mm, $L_{12}$=748 mm and $t_{11}$=1.5 mm, and adhesively bonding a stainless steel inner panel 4 of $t_{12}$=0.5 mm to the rim members 3-1 to 3-4 and the core 2. This structural element corresponds to a section under a window opening of a side structure.

The stainless steel has a Young's modulus of 19700 kgf/mm$^2$ and a Poisson's ratio of 0.3, the GFRP has a Young's modulus of 1410 kgf/mm$^2$, the plastic foam has a Young's modulus of 3 kgf/mm$^2$ (approximate value when the density is 50 kgf/m$^3$.)

Figure 7:
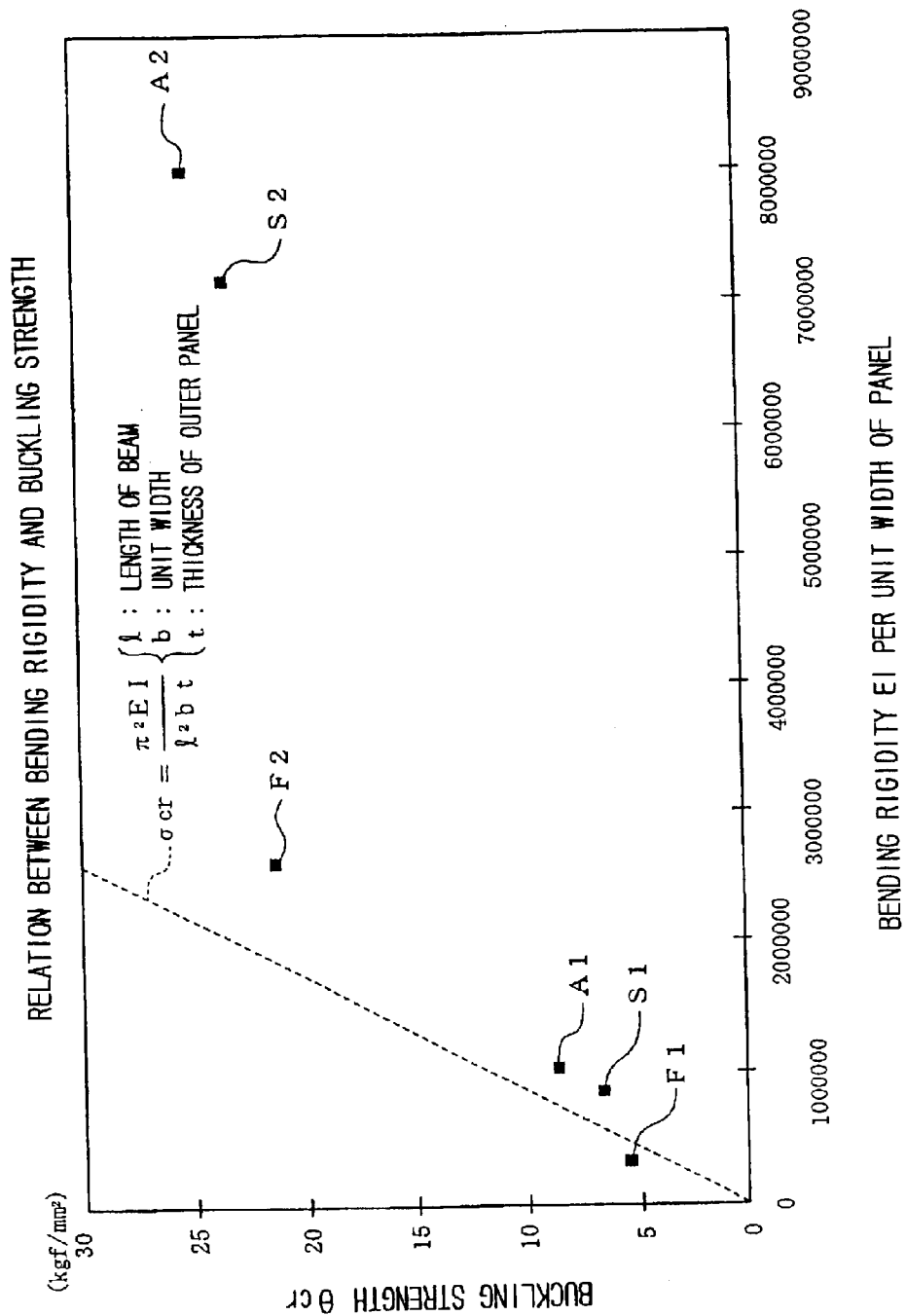
FIG. 7 is a graph showing the relation between the bending rigidity EI per unit width of a panel and buckling strength.

The buckling strength $\sigma_{cr}$ of a panel is proportional to the flexural rigidity of the panel (refer to a broken line in FIG. 7). However, it was verified that the structural elements of all the types excluding the structural element of the type F2 do not meet the proportional relation as shown in FIG. 7 when the cores are formed in a thickness sufficient for the cores to serve as a heat-insulating member, such as 30 mm. It is considered that the proportional relation shown in FIG. 7 is not met because the load is born mainly by the outer panel and the inner panel is loaded indirectly through the core and the rim members, and the core is a structural member having a considerably low Young's modulus.

It is inferred that the same phenomenon occurred also in the structural element of the type F2. However, since the GFRP forming the inner panel has a Young's modulus of 1410 kgf/mm$^2$, which is about 1/10 of the Young's modulus of 19700 kgf/mm$^2$ of the stainless steel of the type S2 and the Young's modulus of 7200 kgf/mm$^2$ of the aluminum alloy of the type A2, the calculated flexural rigidity of the plane is small and the type F2 lies near the broken line shown in FIG. 7. This is supported by a fact that the buckling strength of the structural element of the type F2 is proportional to the square root of the spring constant ($\sqrt{k}$) of the antiplane deflection of the core.

Figure 9:
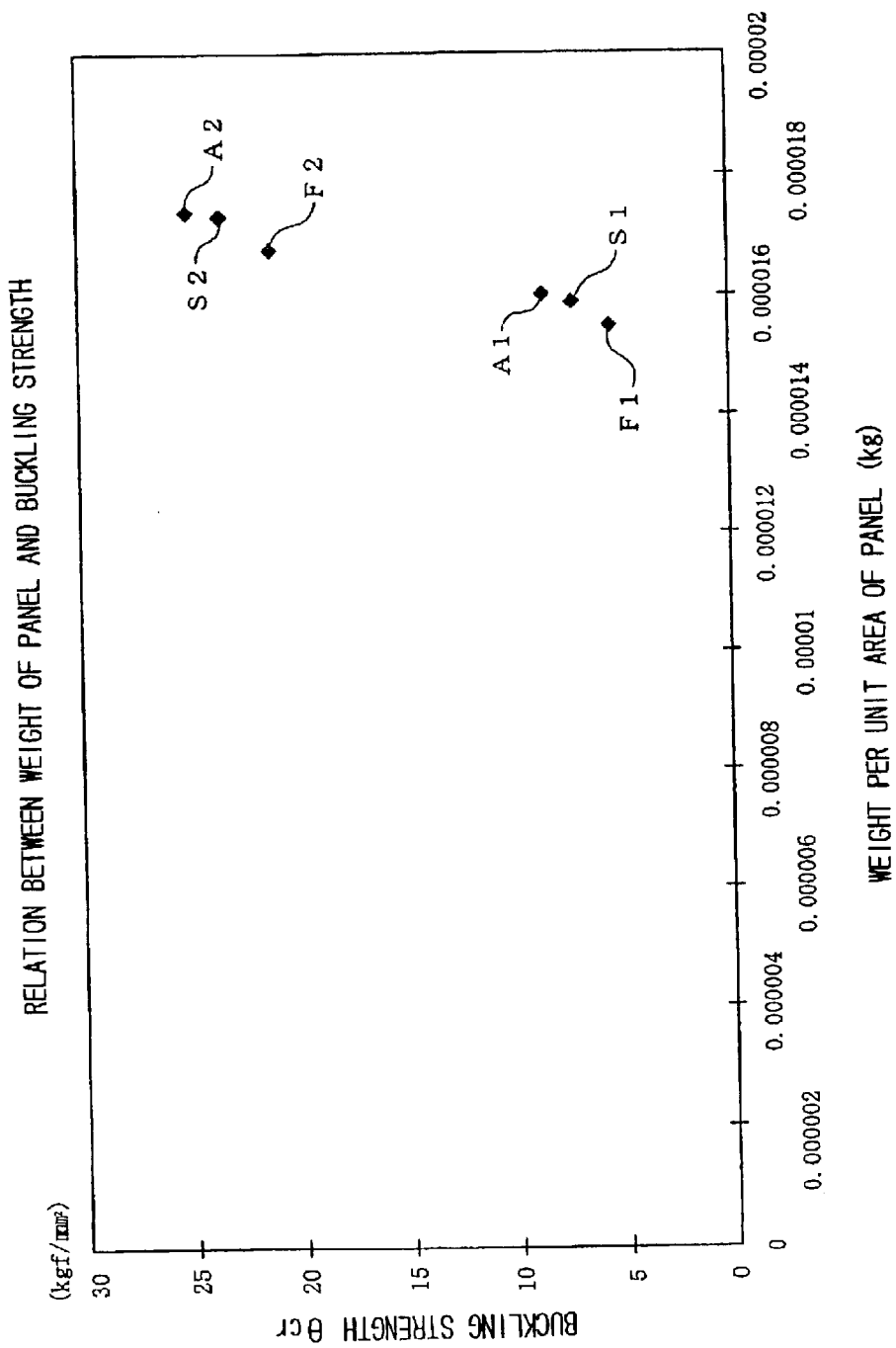
FIG. 9 is a graph showing the relation between the weight per unit area of a panel and the buckling strength of the panel.

Since the structural elements of the types A2, S2 and F2 respectively provided with thick cores behave as elastic support plates when buckles as shown in FIG. 8, the values for the types A2, S2 and F2 lie near a straight line represented by Expression (10) which is good when the buckling while the weight of the core changes very slightly, when the thickness of the core is increased from 10 mm to 30 mm (FIG. 9).

Thus, it is advantageous to use a soft core having a small density and an inner panel having the least possible thickness.

The buckling mode of the structural element of the type S2 shown in Table 1 will be examined.

Unit loads Fx and Fy were applied in an X- and a Y-direction to the structural elements as shown in FIGS. 10(a) and 10(b), respectively, to study buckling, and a unit load F was applied in the X-direction and a load F(a/b) was applied in the Y-direction to the structural elements as shown in FIG. 10(c) to study shear buckling.

Stresses induced in meshes determined by stress analysis were classified into a plurality of levels represented respectively by different colors to enable the recognition of stress distribution in the model at a glance (FIGS. 11 to 14, 15 to 18 and 19 to 22).

(A) Buckling with Respect to the X-direction

Figure 11:
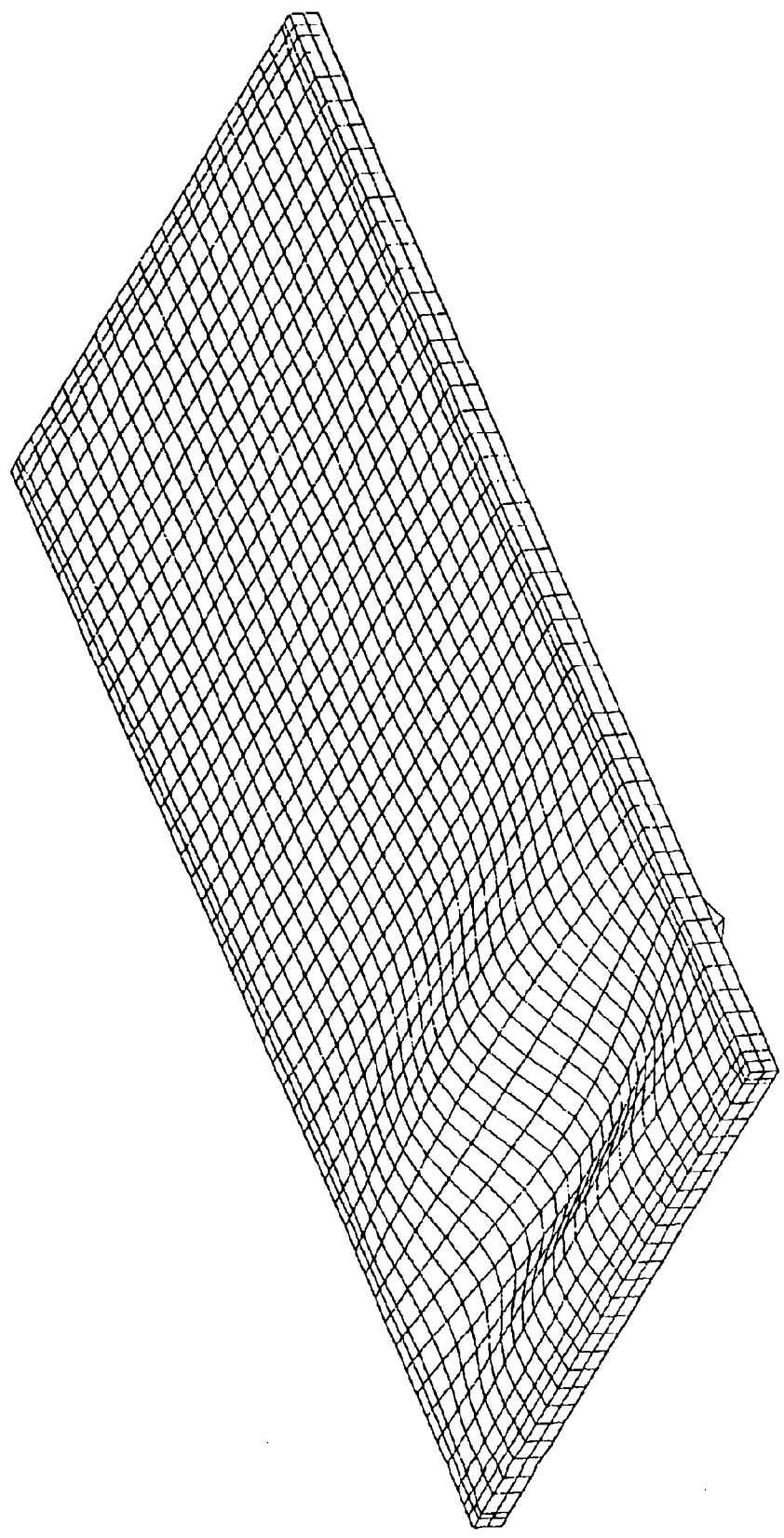
FIG. 11 is a view showing a deformation mode when buckling with respect to the X-direction occurs.
Figure 12:
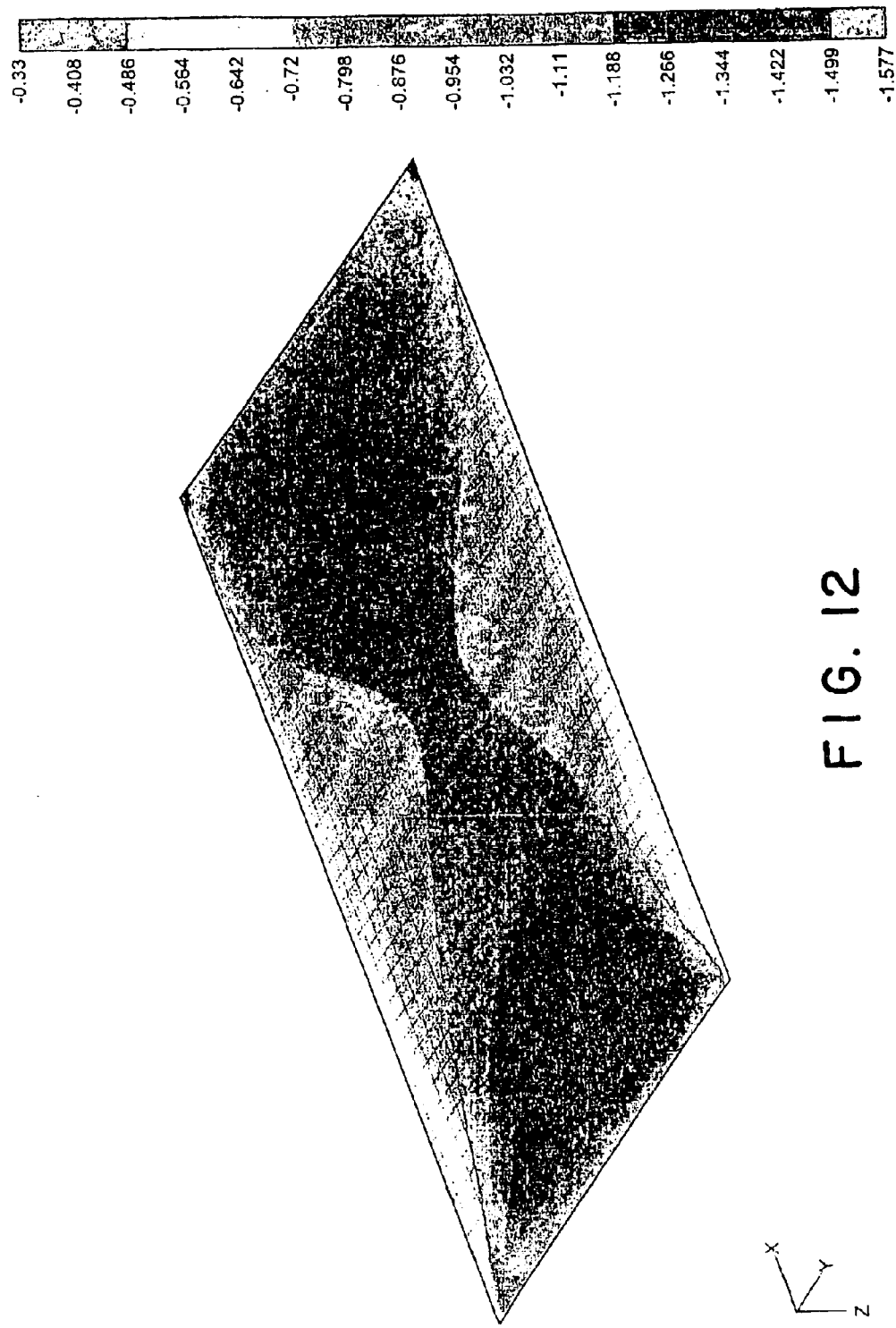
FIG. 12 is a view of assistance in explaining stress induced in an outer panel when buckling with respect to the X-direction occurs.
Figure 13:
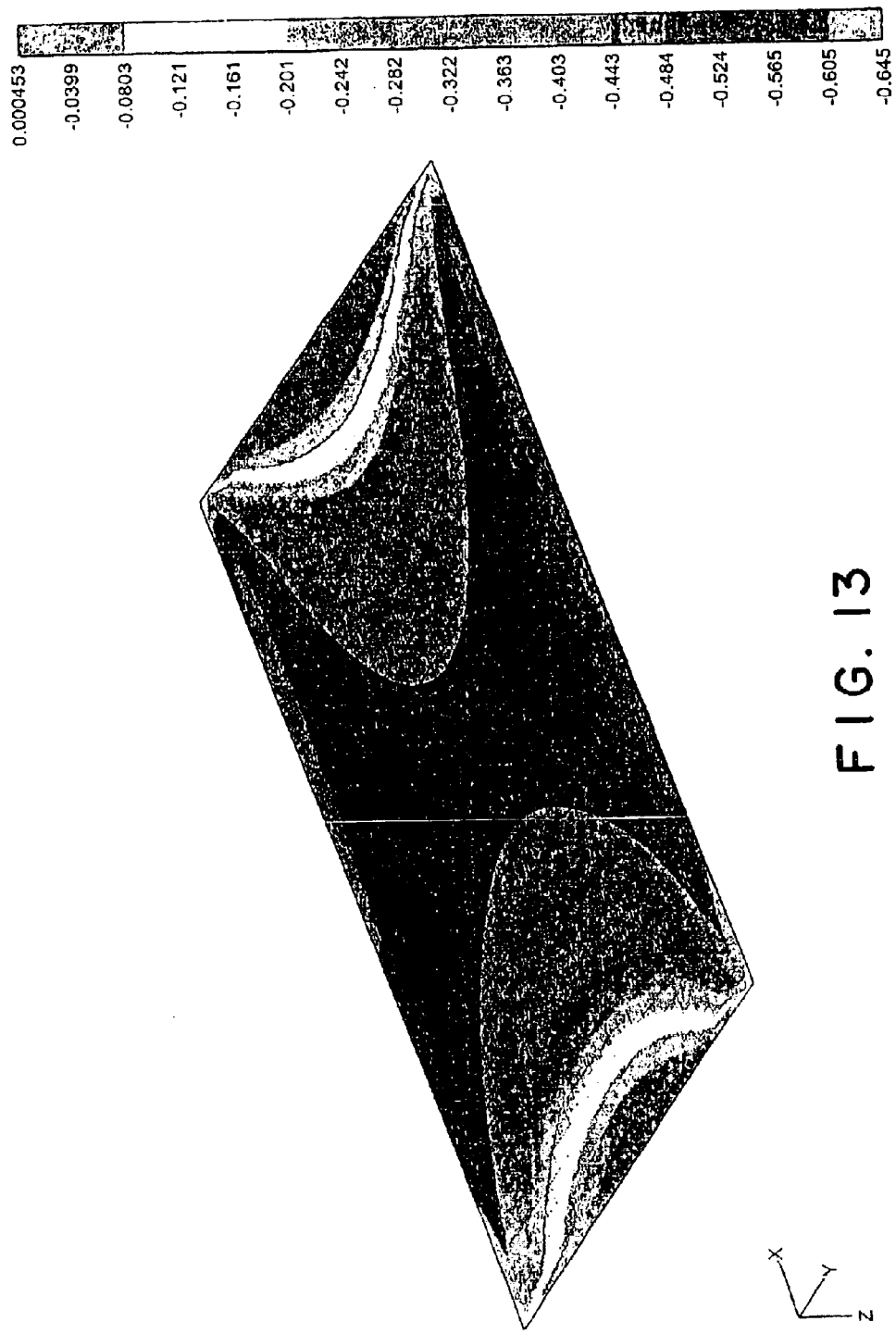
FIG. 13 is a view of assistance in explaining stress induced in an inner panel when buckling with respect to the X-direction occurs.
Figure 14:
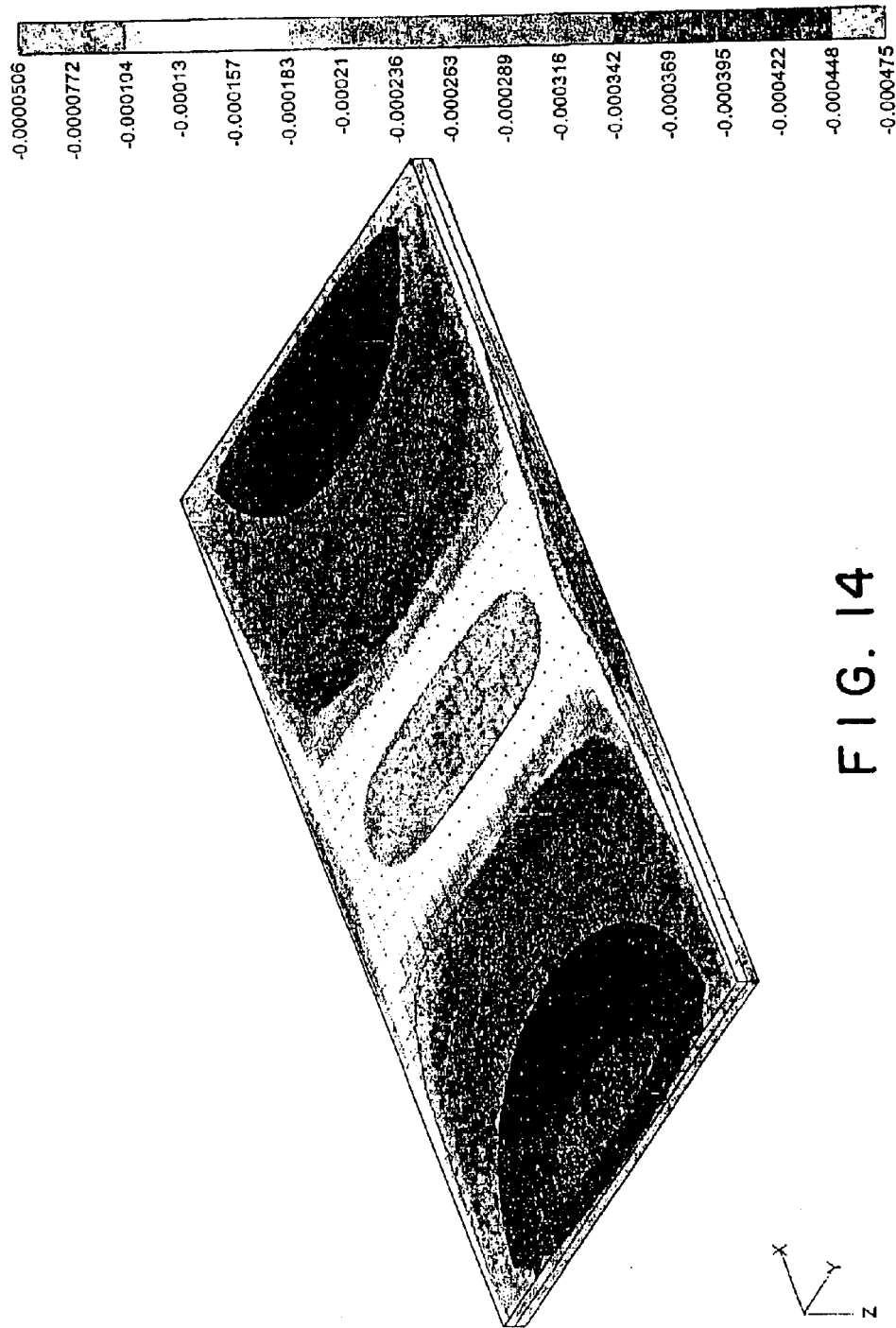
FIG. 14 is a view of assistance in explaining stress induced in a core when buckling with respect to the X-direction occurs.

Buckling load $F_{cr}$=27886 kgf, Outer panel sectional area A=1122 mm$^2$, Mean buckling strength $\sigma_{cr}$=F/A=24.9 kgf/mm$^2$ FIG. 11 shows a deformation mode. Stress distributions in the outer panel, the inner panel and the core of a plastic foam are shown in FIGS. 12 to 14, respectively.

(B) Buckling with Respect to the Y-Direction

Figure 15:
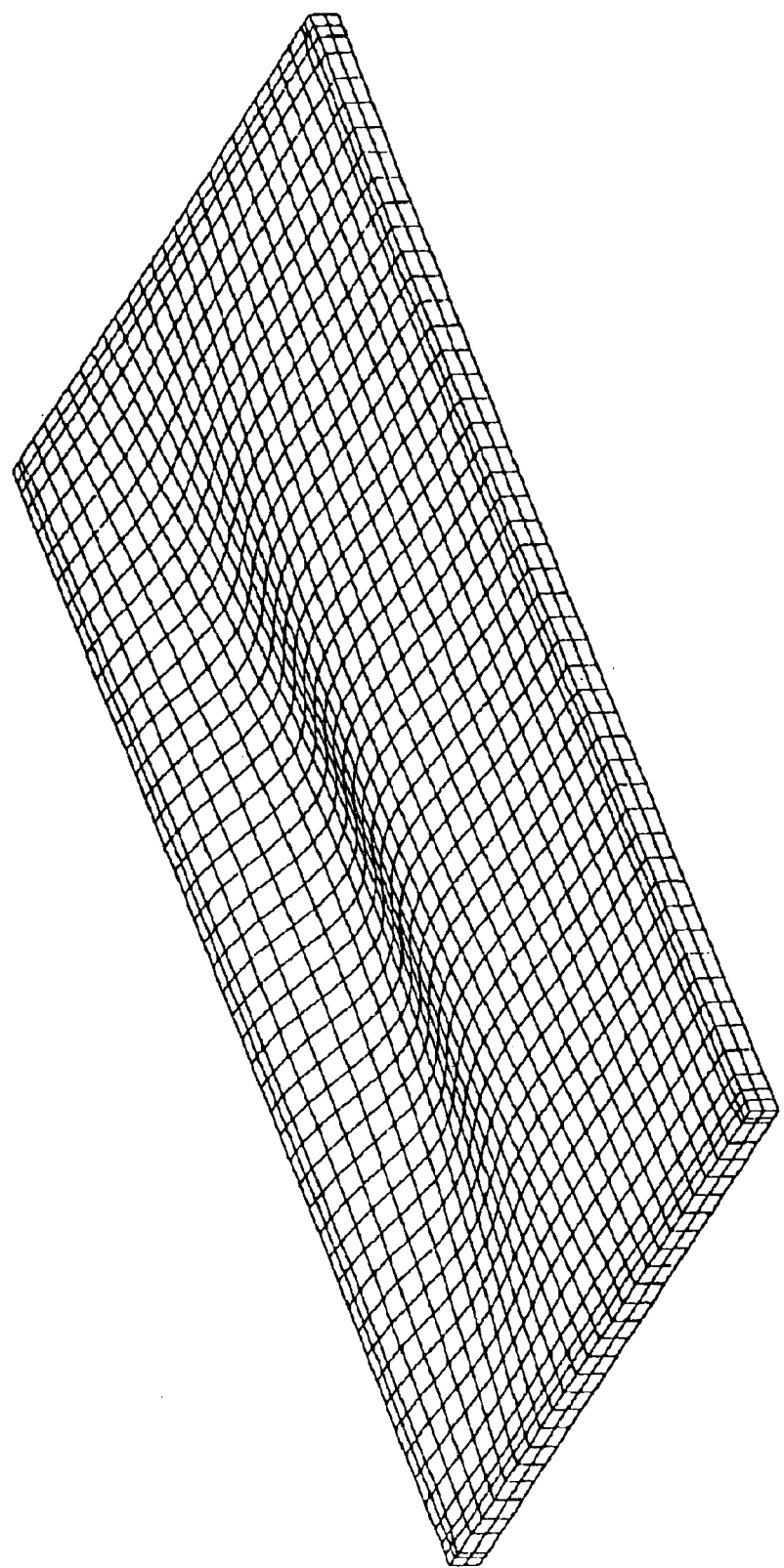
FIG. 15 is a view showing a deformation mode when buckling with respect to the Y-direction occurs.
Figure 16:
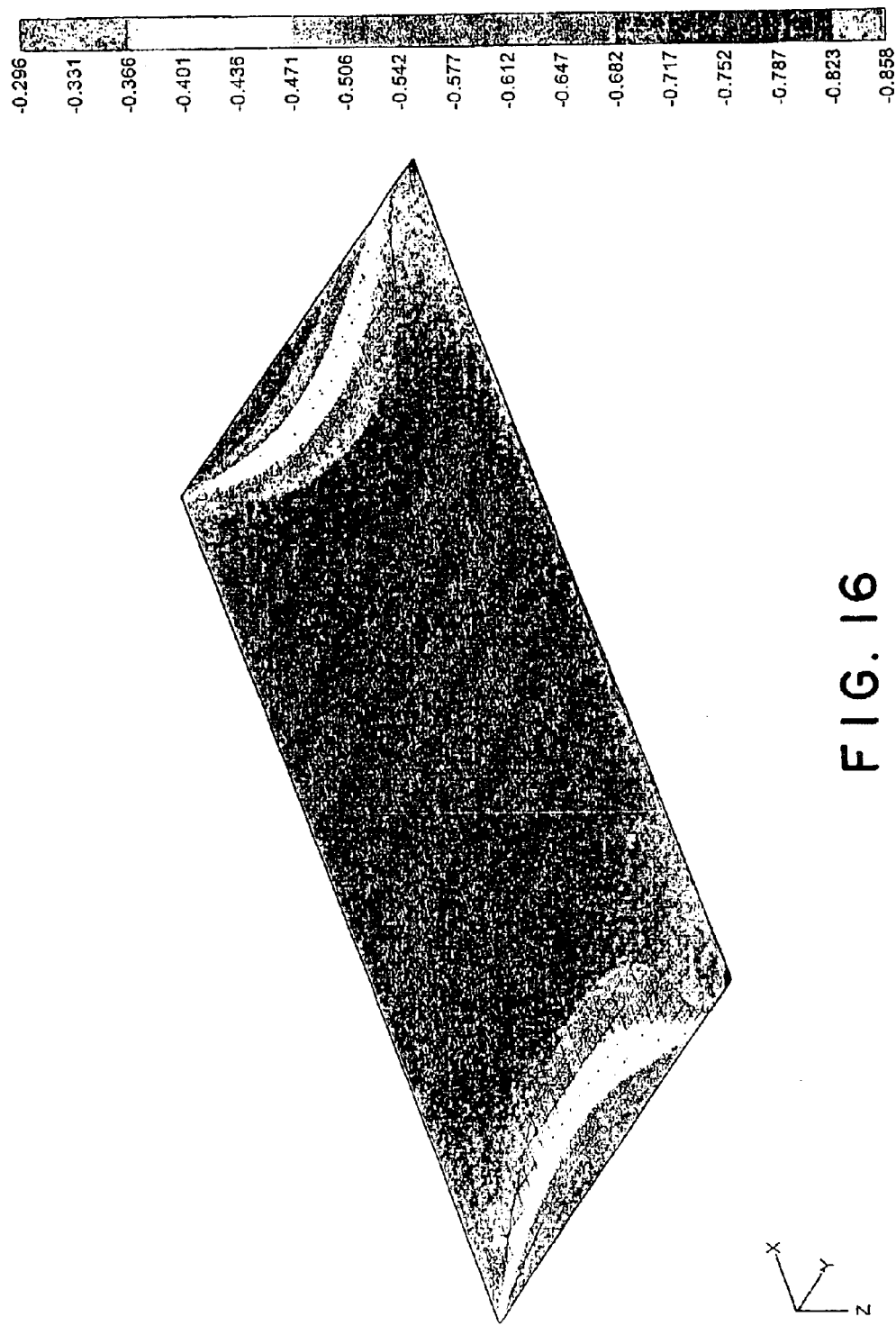
FIG. 16 is a view of assistance in explaining stress induced in an outer panel when buckling with respect to the Y-direction occurs.
Figure 17:
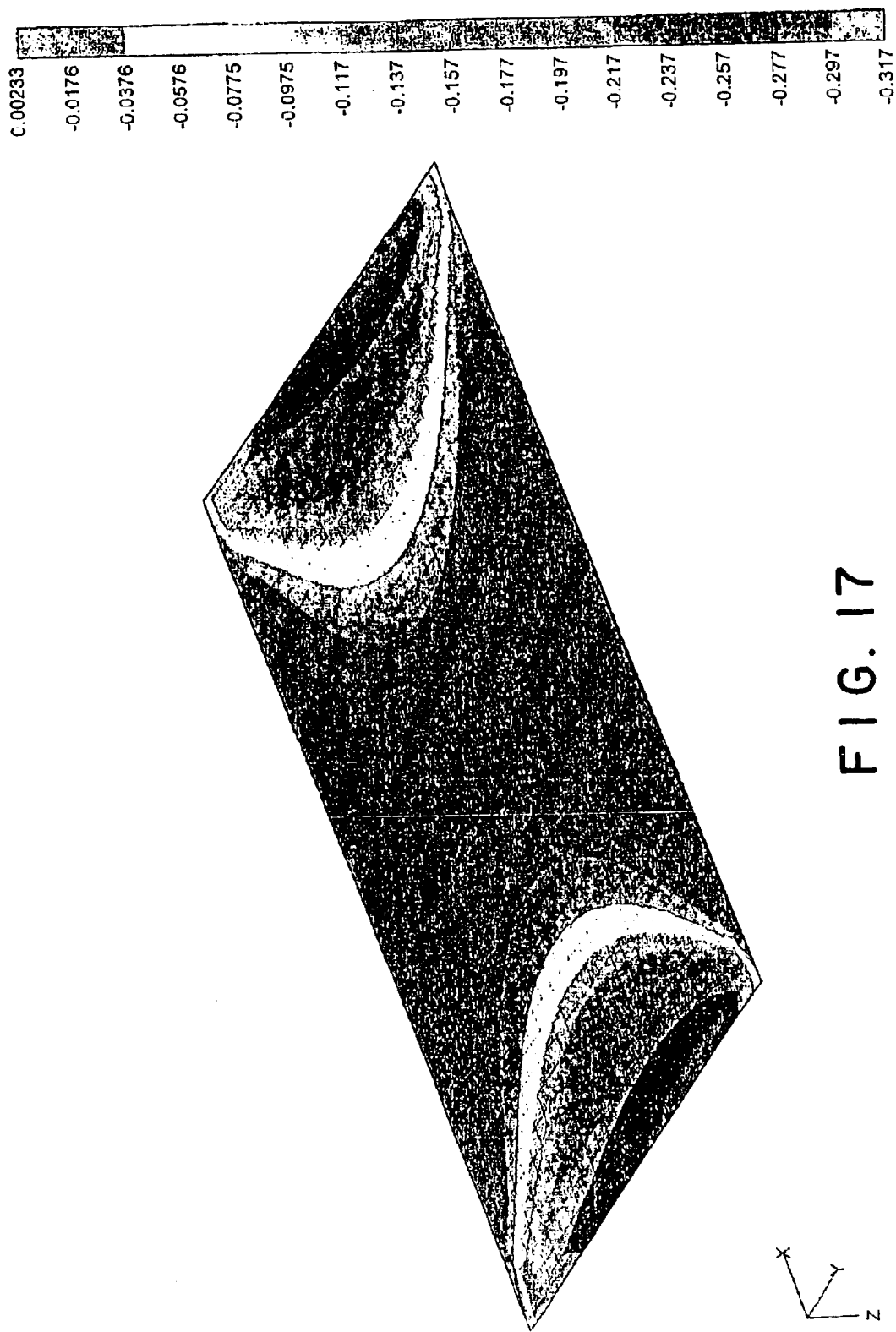
FIG. 17 is a view of assistance in explaining stress induced in an inner panel when buckling with respect to the Y-direction occurs.
Figure 18:
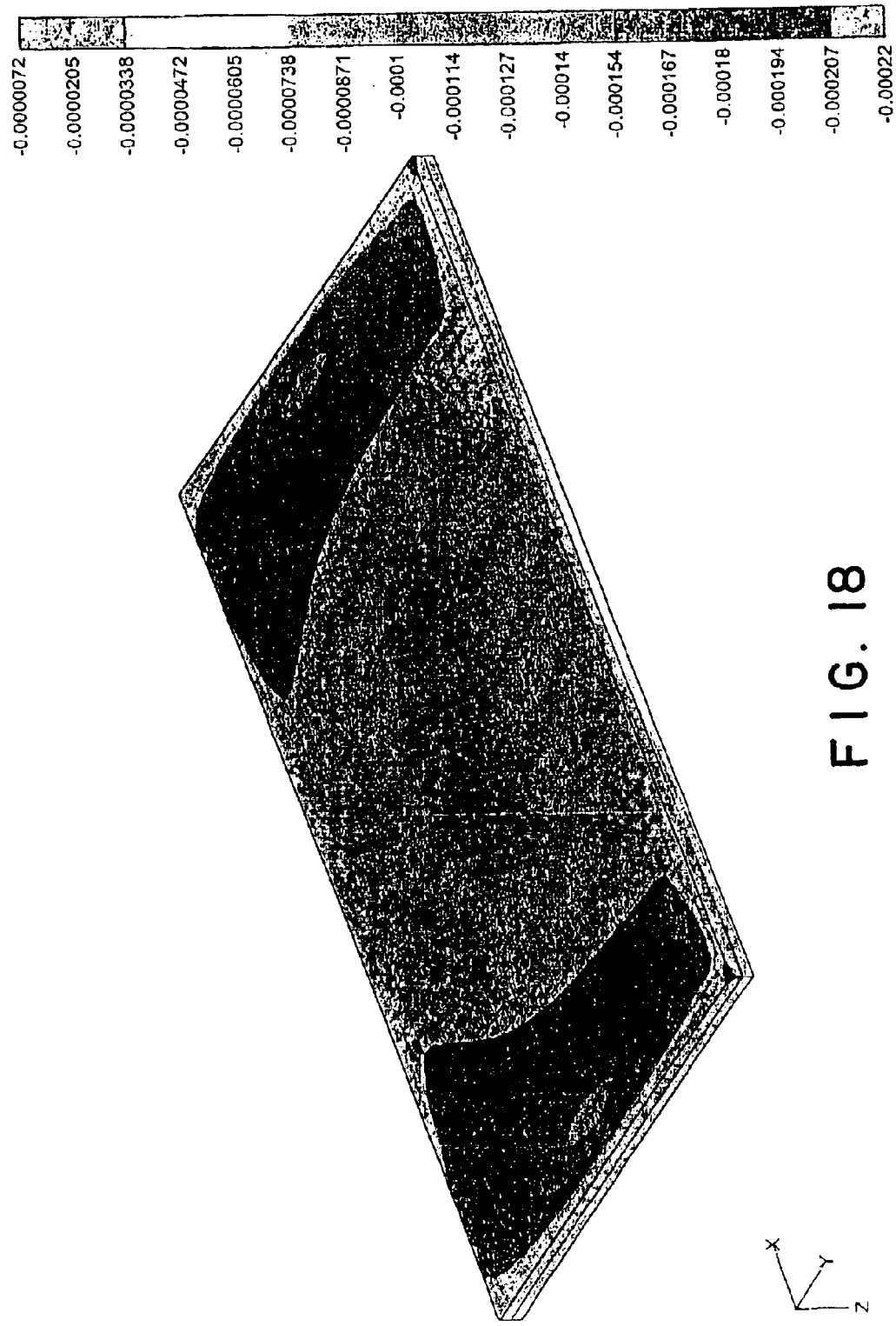
FIG. 18 is a view of assistance in explaining stress induced in a core when buckling with respect to the Y-direction occurs.

Buckling load $F_{cr}$=45358 kgf, Outer panel sectional area A=1935 mm$^2$, Mean buckling strength $\sigma_{cr}$=F/A=23.4 kgf/mm$^2$ FIG. 15 shows a deformation mode. Stress distributions in the outer panel, the inner panel and the core of a plastic foam are shown in FIGS. 16 to 18, respectively.

(C) Shear Buckling

Figure 19:
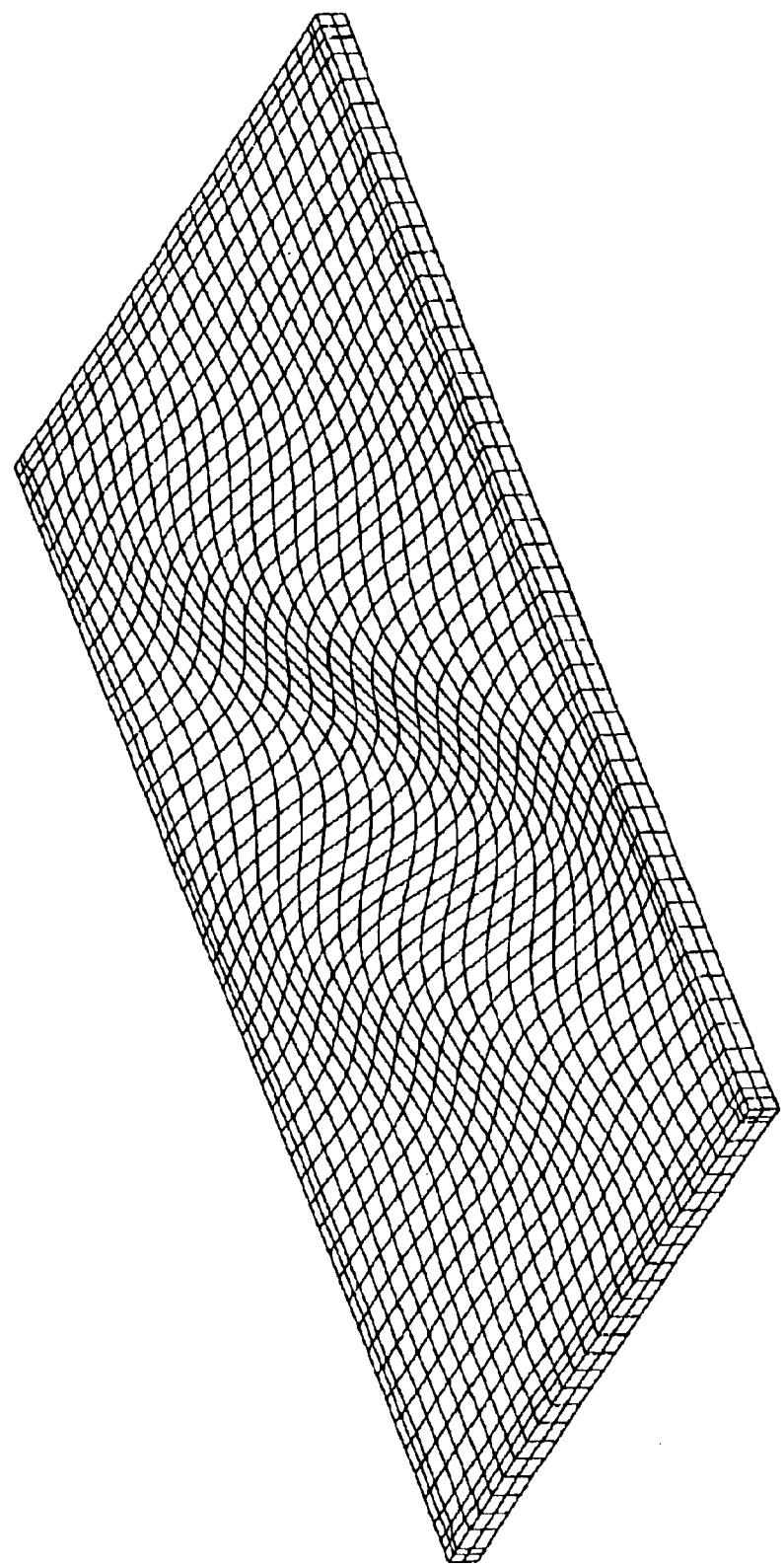
FIG. 19 is a view showing a deformation mode when shear buckling occurs.
Figure 20:
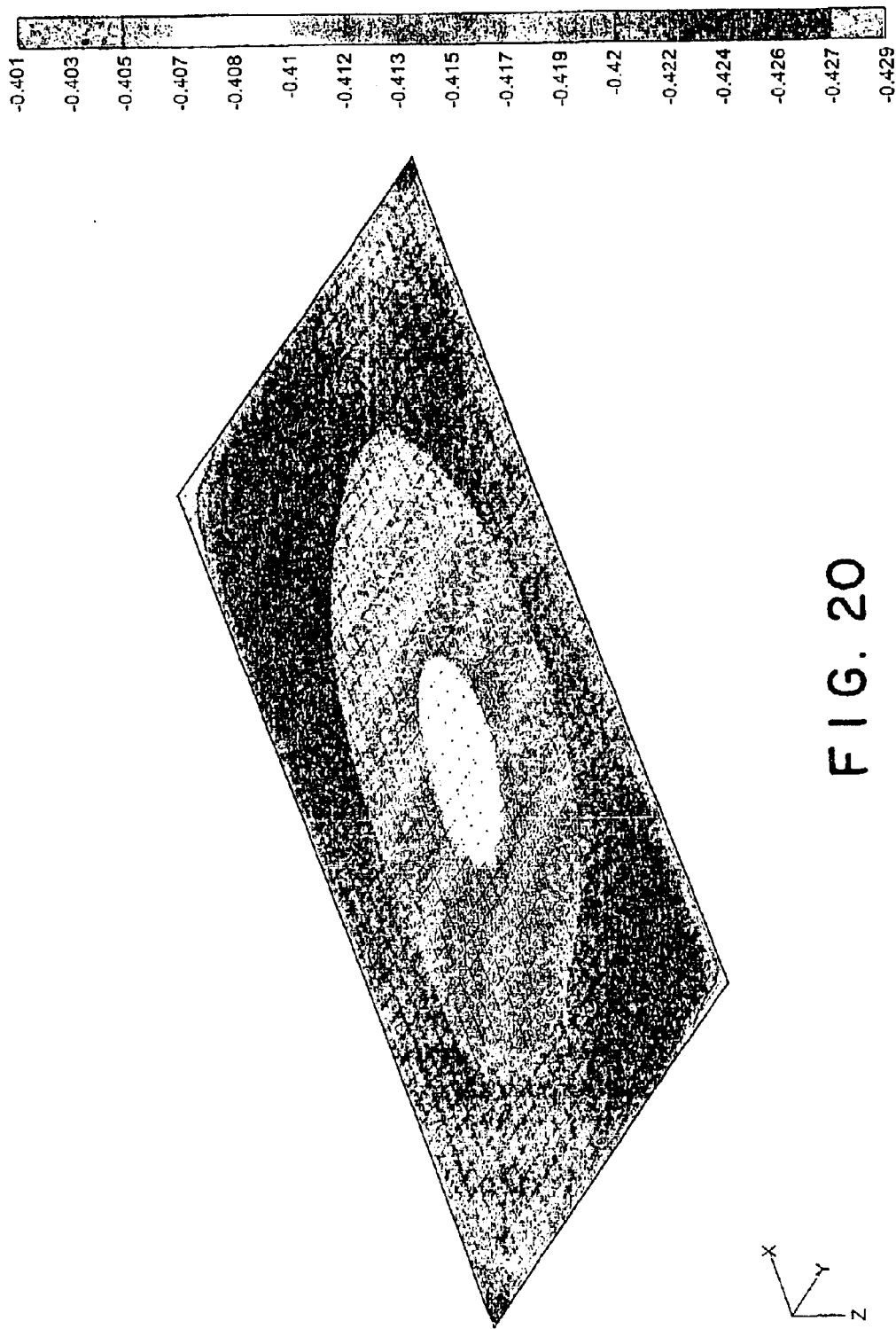
FIG. 20 is a view of assistance in explaining stress induced in an outer panel when shear buckling occurs.
Figure 21:
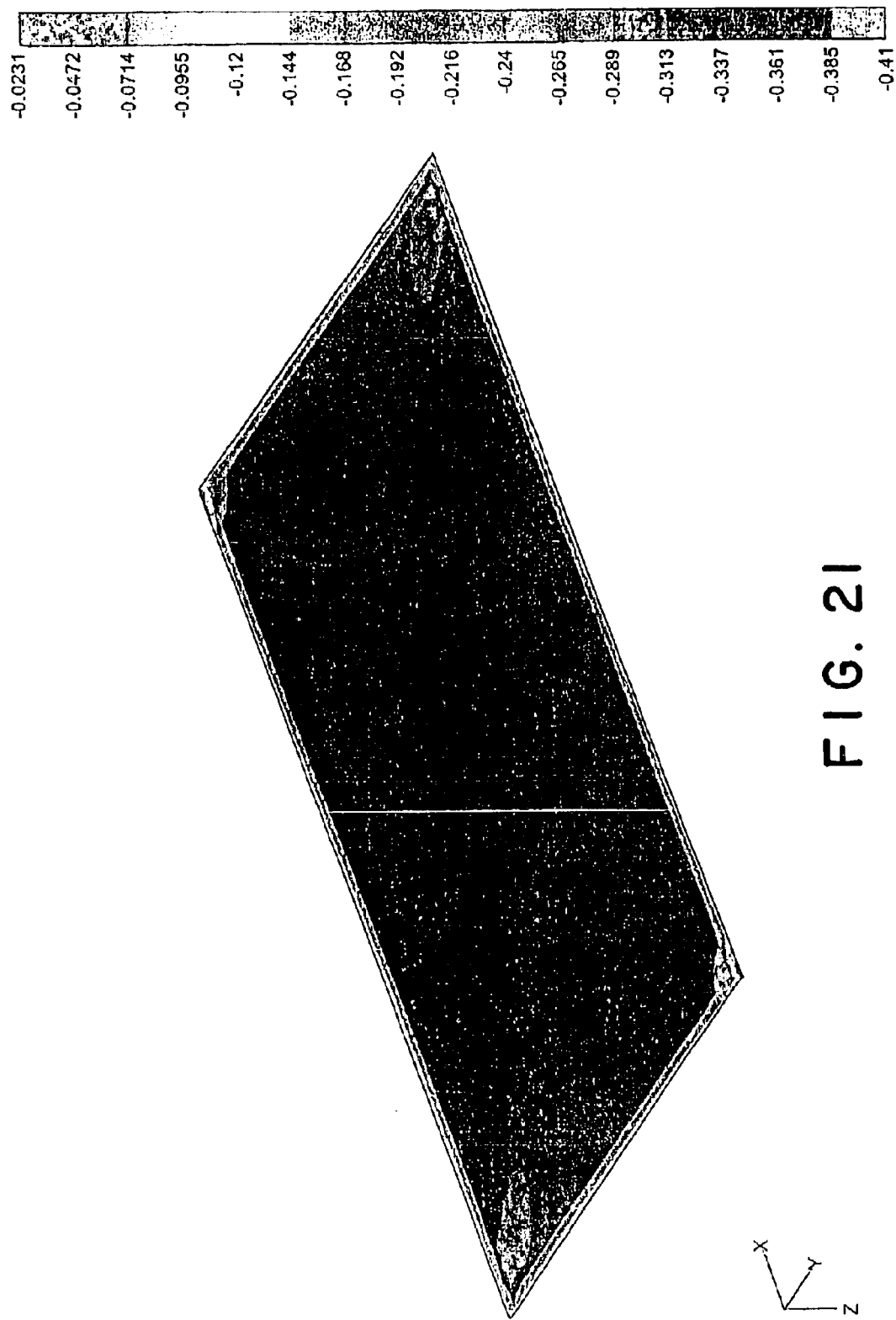
FIG. 21 is a view of assistance in explaining stress induced in an inner panel when shear buckling occurs.
Figure 22:
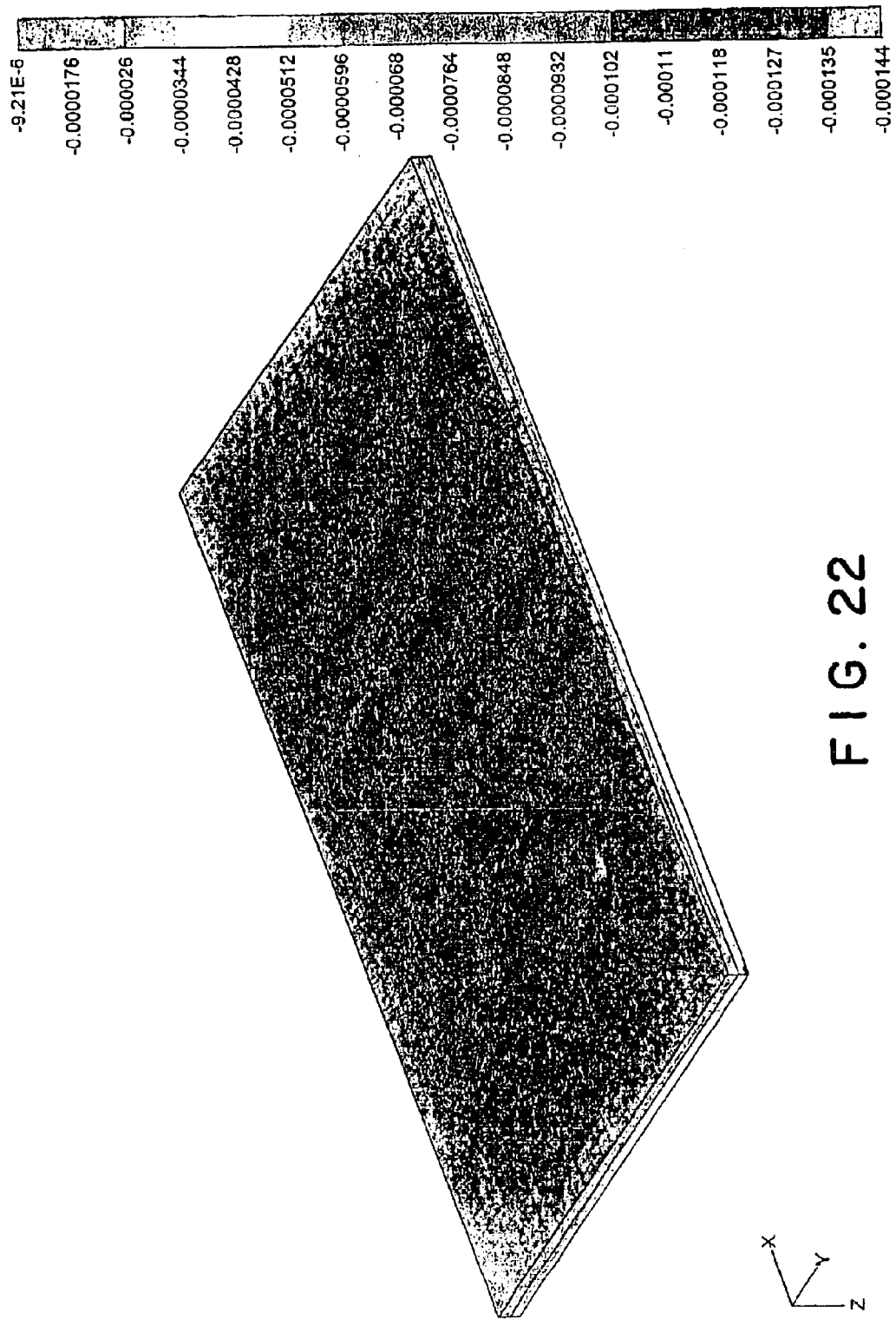
FIG. 22 is a view of assistance in explaining stress induced in a core when shear buckling occurs.

Buckling load $F_{cr}$=49377 kgf, Outer panel sectional area A=1935 mm$^2$, Mean buckling strength $\sigma_{cr}$=F/A=25.5 kgf/mm$^2$ FIG. 19 shows a deformation mode. Stress distributions in the outer panel, the inner panel and the core of a plastic foam are shown in FIGS. 20 to 22, respectively.

It is known from the results of analysis that the mean buckling strength of 24.9 kgf/mm$^2$ with respect to the X-direction is practically sufficiently high because a necessary buckling strength with respect to the X-direction is on the order of 15 kgf/mm$^2$ at the maximum.

Figure 3:
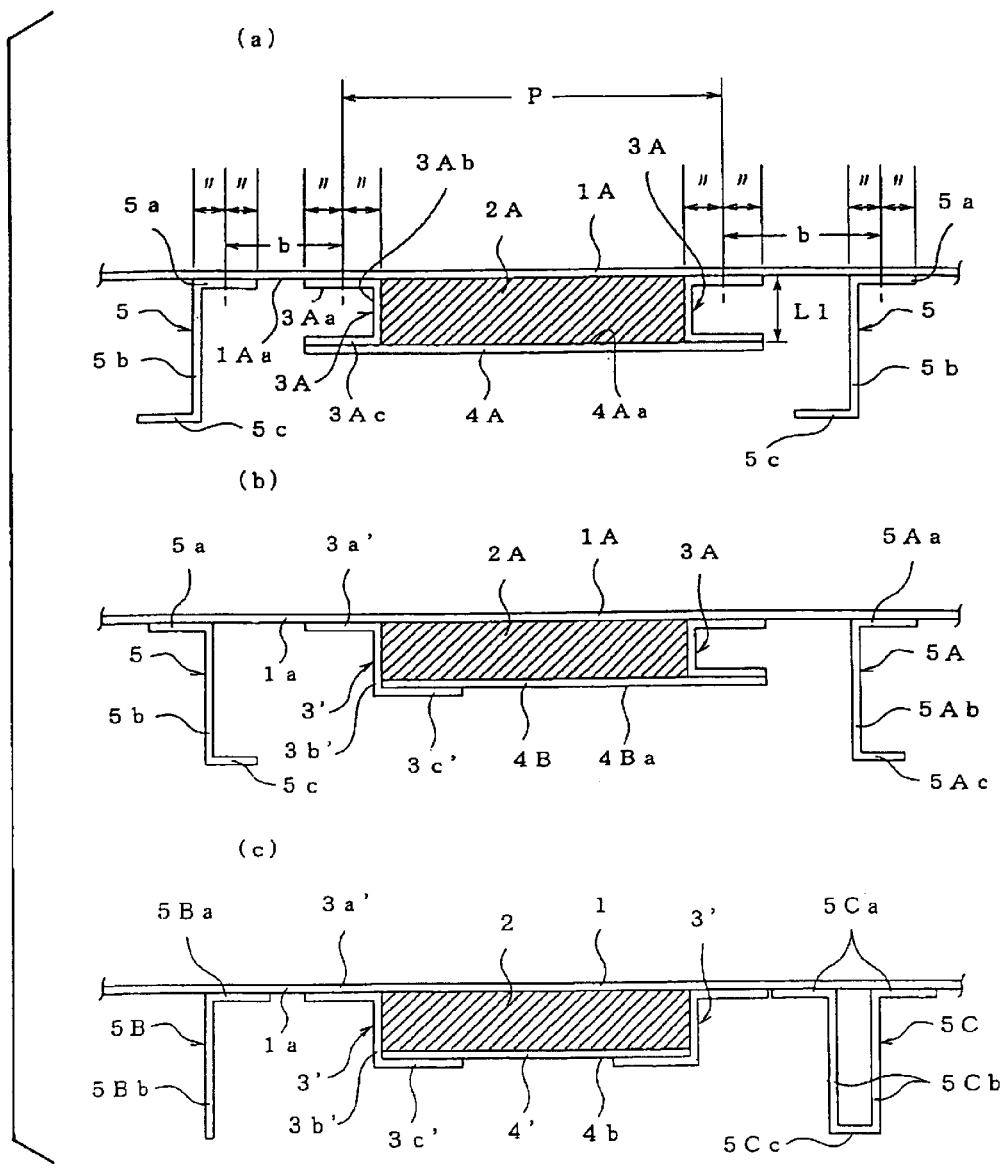
FIGS. 3(a), 3(b) and 3(c) are schematic views of structural elements in other embodiments according to the present invention.

FIGS. 3(a), 3(b) and 3(c) show body structures according to the present invention each including a structural element and frame members. Frame members 5, 5A, 5B and 5C are joined to outer panels 1A, and 1, and sections (elastic support parts) including inner panels 4a, 4b and 4' and rim members 3A and 3' are formed between the frame members 5, 5A, 5B and 5C. Since the inner panels 4a, 4b and 4' are discrete members for the sections, most part of load placed on the body structures is born by the outer panels 1A and 1 and hence the inner panels 4a, 4b and 4' are scarcely loaded. Therefore, the inner panels 4a, 4b and 4' maybe structural members of a lightweight material, such as a fiber reinforced plastic material (FRP) or an aluminum alloy, or a stainless steel panels of a thickness not greater than ⅓ of the thickness of the outer panels. Since the inner panels 4a, 4b and 4' are adhesively bonded to the cores 2A and 2 so as to cover the cores 2A and 2, the cores 2A and 2 are not exposed to air and hence the body structures are fire-resistant.

The rim members of the structural elements are not limited to rim members 3 and 3' having a substantially Z-shaped cross section and may be rim members having a substantially U-shaped cross section. Rim members having a substantially Z-shaped cross section and those having a substantially U-shaped cross section may used in combination. The rim members may be of any suitable shapes provided that the same are capable of holding peripheral parts of the core 2.

For example, a rim member 3A having a substantially U-shaped cross section as shown in FIG. 3(a) may be used instead of the rim members having a substantially Z-shaped cross section.

The rim member 3A has an outer joining part 3Aa attached to the inner surface 1Aa of an outer panel 1A, a vertical wall part 3Ab extending from an edge of the joining part 3Aa substantially perpendicularly to the joining part 3Aa, and an inner joining part 3Ac extending from an inner edge of the vertical wall part 3Ab in parallel to the joining part 3Aa in the direction of extension of the joining part 3Aa and attached to the inner surface 4Aa of an inner panel 4A. The rim member 3A has a substantially U-shaped cross section opening outward, i.e., in a direction away from the core 2A. Peripheral parts of the inner panel 2A substantially coincide with the joining parts 3Aa and 3Ab. Thus, the edges of the inner panel 2A do not project from the rim members 3A. However, the peripheral parts do not need necessarily coincide with the joining parts.

The frame members 5 are formed by bending plates (stainless steel plates). Each of the frame members 5 has an outer joining part 5a attached to the inner surface 1Aa of the outer panel 1A, a vertical wall part 5b extending from an edge of the joining part 5a substantially perpendicularly to the joining part 5a, and an inner joining part 5c extending from an inner edge of the vertical wall part 5b in parallel to the outer joining part 5a in a direction opposite a direction in which the outer joining part 5a extends. It is desirable to place the frame member 5 as close as possible to the rim member 3A to avoid the buckling of a part between the frame member 5 and the rim member 3A.

As shown in FIG. 3(b), a rim member 3A having a substantially U-shaped cross section and a rim member 3' having a substantially Z-shaped cross section may be used in combination. The rim members 3' having a substantially Z-shaped cross section has an outer joining part 3a' joined to the inner surface 1Aa of the outer panel 1A, a vertical wall part 3b' extending from an edge of the joining part 3a' substantially perpendicularly to the joining part 3a', and an inner joining part 3c' extending from an inner edge of the vertical wall part 3b' in parallel to the outer joining part 3a' in a direction opposite a direction in which the outer joining part 3a' extends from the outer edge of the wall part 3b'.

The body structure is provided with a frame member 5A having a substantially U-shaped cross section. The frame member 5A has an outer joining part 5Aa joined to the inner surface 1Aa of the outer panel 1A, a vertical wall part 5Ab extending from an edge of the outer joining part 5Aa perpendicularly to the outer joining part 5Aa, and an inner joining part 5Ac extending from the inner edge of the vertical wall part 5Ab in parallel to the outer joining part 5Aa in the direction of extension of the outer joining part 5Aa.

A frame member 5B of a substantially L-shaped cross section having an outer joining part 5Ba and a vertical wall part 5Bb, and another frame member 5C of a substantially hat-shaped cross section having a main part 5Ca of a substantially U-shaped cross section, and two outer joining parts 5Cb and 5Cc respectively extending in opposite directions as shown in FIG. 3(c) may be used.

A body structure according to the present invention is a flat structure in which only an outer panel is extended between a rim member and a frame member, and this part must have a necessary buckling strength.

Conditions for securing buckling strength with respect to a direction parallel to the frame member will be explained.

Figure 4:
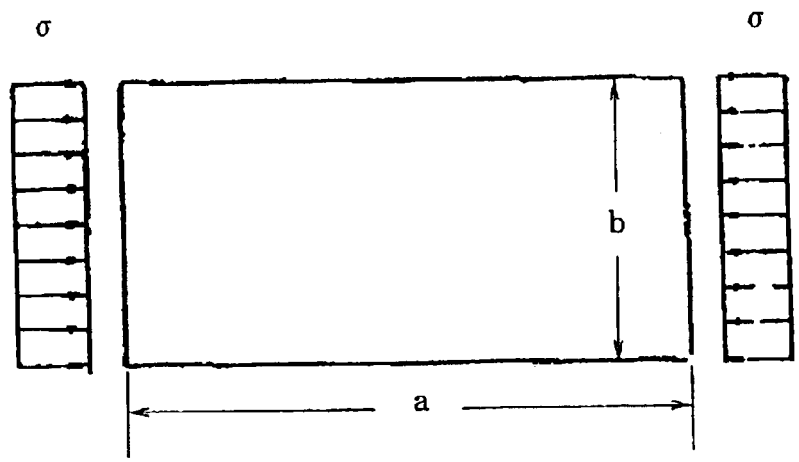
FIG. 4 is a view of assistance in explaining a method of calculating the buckling strength of a part of an outer panel extending between a rim member of a structural element and a frame member of a frame element.

The buckling strength $\sigma_{cr}$ of a flat panel shown in FIG. 4 is represented generally by Expression (12).

$$\sigma_{cr} = K \frac{\pi^2 E}{12(1-v^2)} \left(\frac{t}{b}\right)^2 \quad (12)$$

Figure 5:
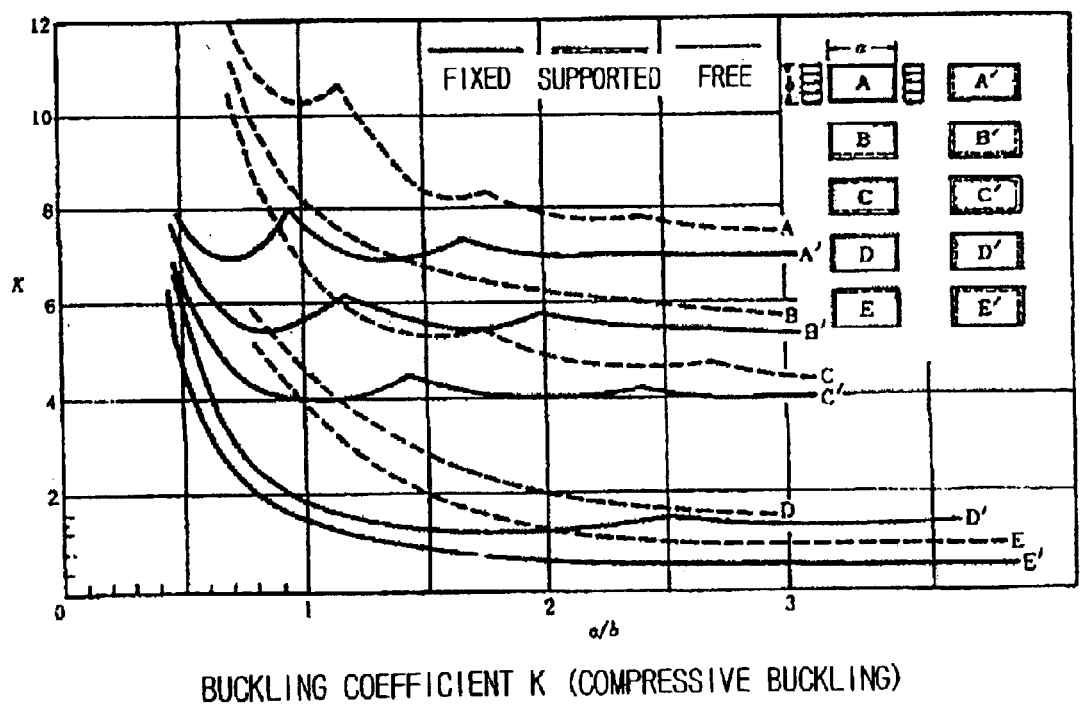
FIG. 5 is a graph of assistance in explaining buckling coefficient.

E: Young's modulus of the panel
v: Poisson's ratio
π: Ratio of the circumference of a circle to its diameter,
t: Thickness of the panel
b: width of the panel
a: Length of the panel
K: Buckling coefficient (FIG. 5)

Buckling coefficient K is dependent on the constraining condition around the panel and the value of a/b. However, if the length a of the panel is sufficiently greater than the width b of the panel supported around its edges (a/b≧1), it is possible to consider on the basis of data shown in FIG. 5 that the buckling coefficient K=4. Therefore, Expression (1) is obtained on an assumption that K=4.

$$b \leq t \sqrt{\frac{\pi^2 E}{3(1-v^2)\sigma_{c1}}} \quad (1)$$

t: Thickness of the outer panel
π: Ratio of the circumference of a circle to its diameter,
E: Young's modulus of the outer panel,
v: Poisson's ratio of the outer panel, and
$\sigma_{c1}$: Compressive stress parallel to the frame member induced in a part of the outer panel between the frame member and the rim member of the structural element parallel to the frame member, when the body structure is loaded Although only the outer panel of the structural element extends between the frame member of the frame element and the rim member of the structural element, the outer panel is able to secure a necessary buckling strength with respect to a direction parallel to the frame member, provided that the width b meets Expression (1).

When the outer panel is formed of a stainless steel and has a thickness of 1.5 mm, and a compressive stress $\sigma_{c1}$=15 kgf/mm² is induced in a part of the outer panel extending between the frame member and the rim member adjacent and parallel to the frame member in a direction parallel to the frame member, the width (which corresponds to the distance between the frame member and the rim member adjacent and parallel to the frame member) b must be 103 mm or below.

$$b \le t\sqrt{\frac{\pi^2 E}{3(1-v^2)\sigma_{c1}}} = 1.5 \times \sqrt{\frac{\pi^2 \times 19700}{3 \times (1-0.3^2) \times 15}} = 103 \text{ mm}$$

Conditions for securing buckling strength with respect to a direction perpendicular to the frame member will be explained. The buckling strength of a flat panel can be approximated by the buckling of a beam having a unit width along a direction perpendicular to the direction of stress on an assumption that the length a of the panel is sufficiently smaller than the width b of the same (a/b≦0.5). The buckling strength of a beam supported at both ends is represented by Expression (13).

$$\sigma_{cr} = \frac{\pi^2 EI}{l^2 A} \quad (13)$$

E: Young's modulus
π: Ratio of the circumference of a circle to its diameter
I: Geometrical moment of inertia of the beam
l: Length of the beam
A: Sectional area of the beam The geometrical moment of inertia I of a flat panel of a unit width and thickness t is equal to $t^3/12$ and the sectional area A=t. By considering L to be the width b which corresponds to the distance between the frame member and the rim member.

$$b \le t\sqrt{\frac{\pi^2 E}{12\sigma_{c2}}} \quad (2)$$

t: Thickness of the outer panel
π: Ratio of the circumference of a circle to its diameter
E: Young's modulus of the outer panel
v: Poisson's ratio of the outer panel
$\sigma_{c2}$: Compressive stress in a direction perpendicular to the frame member induced in a part of the outer panel between a frame member of a frame element and a rim member of a structural element adjacent and parallel to the frame element when the body structure is loaded Thus, the part, between the frame member of the frame element and the rim member of the structural element, of the outer panel is able to secure a necessary buckling strength with respect to a direction parallel to the frame member when the width b of the part of the outer panel has meet the condition represented by Expression (2).

When the outer panel is formed of a stainless steel and has a thickness of 1.5 mm, and a compressive stress $\sigma_{c2}$=15 kgf/mm² is induced in a part of the outer panel extending between the frame member and the rim member adjacent and parallel to the frame member in a direction perpendicular to the frame member, the width b must be 49 mm or below.

$$b \le t\sqrt{\frac{\pi^2 E}{12\sigma_{c2}}} = 1.5 \times \sqrt{\frac{\pi^2 \times 19700}{12 \times 15}} = 49 \text{ mm}$$

A railroad car including the foregoing body structure will be concretely described with reference to the drawings by way of example.

EXAMPLE 1

A side structure, i.e., a body structure according to the present invention, of a railroad car is shown in FIG. 23 to 29. A side structure 21 included in a railroad car is provided with an window opening 22, and door openings 23 and 24 formed on the longitudinally opposite sides of the window opening 22, respectively. The side structure 21 excluding parts corresponding to the window opening 22 and the door openings 23 and 34 are divided into a plurality of sections (elastic support parts). A first section S11 extends vertically between the window opening 22 and the door opening 23, a second section S12 extends vertically between the window opening 22 and the door opening 24, and a third section S13 of a width substantially equal to that of the window opening 22 extends under the window opening 22.

This side structure, similarly to the conventional side structure, is provided with reinforcing members 105A and 105B and frame members 106C, 106D, 106F and 106G.

Each of the sections S11 to S13 has a rectangular shape having longitudinal sides and vertical sides. The sections S11 to S13 have a pair of longitudinal rim members 3A1 and 3A2, a pair of longitudinal rim members 3B1 and 3B2, a pair of longitudinal rim members 3C1 and 3C2, respectively. The sections S11 to S13 have a pair of vertical rim members 3A3 and 3A4, a pair vertical rim members 3B3 and 3B4, and a pair of vertical rim members 3C3 and 3C4, respectively. Inner panels 4A to 4C are bonded adhesively to the rim members 3A1 to 3A4, the rim members 3B1 to 3B4, and the rim members 3C1 to 3C4 to hold cores 2A to 2C on the inner surface of the outer panel 1, respectively. The adjacent ones of the inner panels 4A to 4C are not connected.

Since the outer panel 1 is supported elastically by the cores 4A to 4C attached to its inner surface, the outer panel 1 has a buckling strength higher than the outer panel, not elastically supported, of the outer panel of a conventional side structure and hence the side structure needs less reinforcing members than the conventional side structure. Therefore, welding amount, welding distortion, and spot-welding impressions can be reduced. Only parts around the door openings 23 and 24 are reinforced by reinforcing members.

Since there is not any restriction on the layout of outer panels in connecting outer panels to form an elastic support structure, joints can be eliminated from the outer panel. The elimination of joints in the outer panel combined with the reduction of welding amount and welding distortion is effective in improving the appearance of the side structure. Since the cores 2 may be formed of a heat-insulating material, such as a plastic foam, the side structure is simple in construction and lightweight.

Since the inner panels 4A to 4C are not loaded, the inner panels 4A to 4C may be thinner than the outer panel 1 or may be formed of a lightweight material, such as a fiber-reinforced plastic material or an aluminum alloy.

EXAMPLE 2

Figure 23:
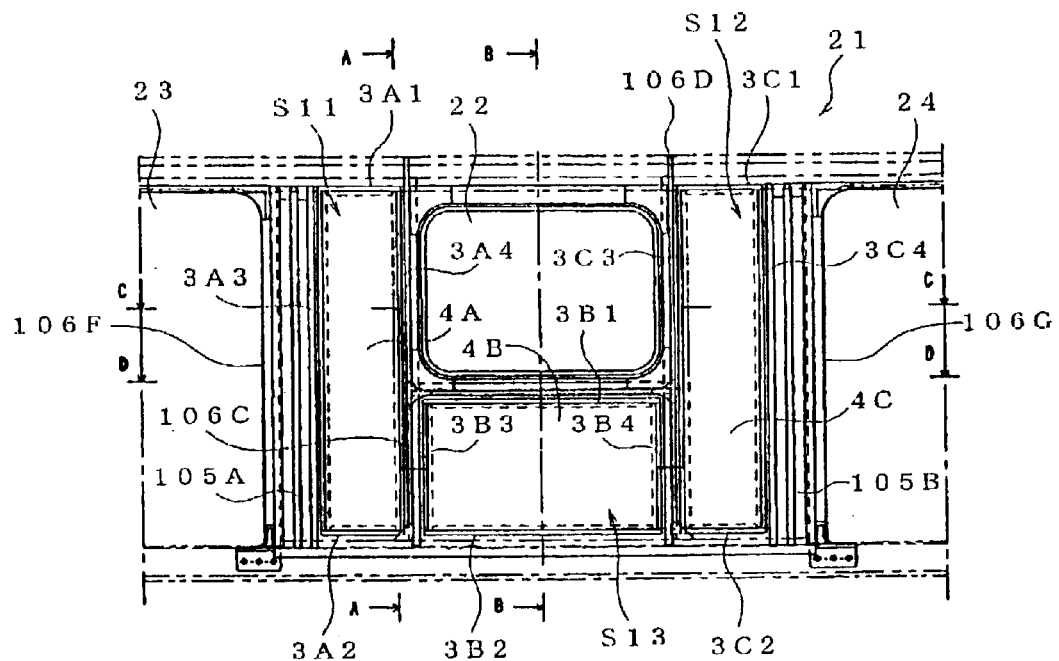
FIG. 23 is a front elevation of a side structure according to the present invention as viewed from the inner side.
Figure 24:
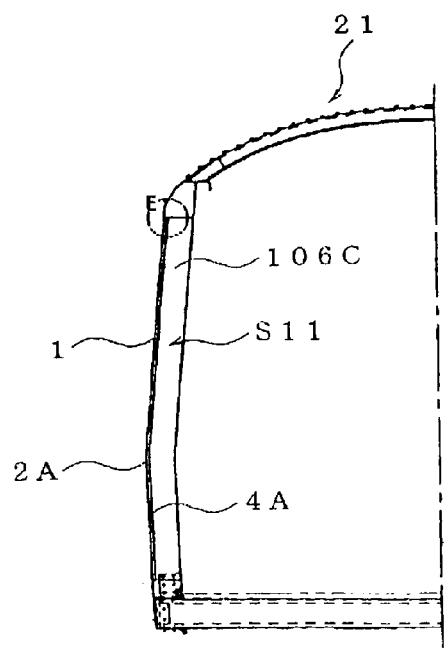
FIG. 24 is a sectional view taken on line A—A in FIG. 23.
Figure 25:
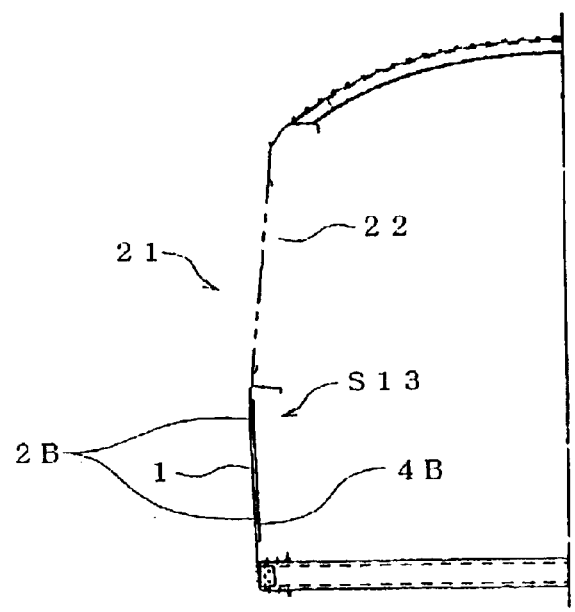
FIG. 25 is a sectional view taken on line B—B in FIG. 23.
Figure 26:
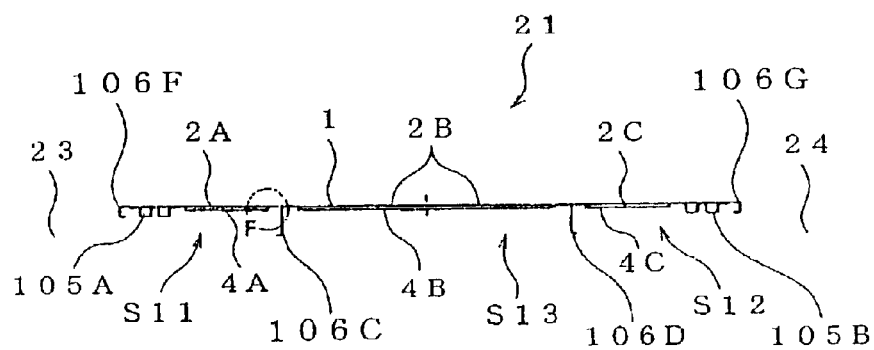
FIG. 26 is a sectional view taken on line C—C in FIG. 23.
Figure 27:
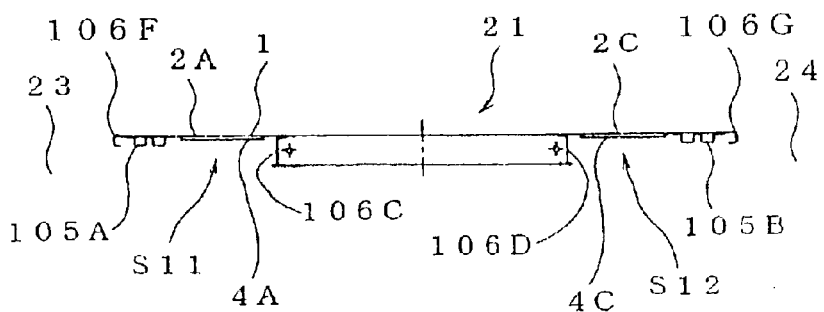
FIG. 27 is a sectional view taken on line D—D in FIG. 23.
Figure 28:
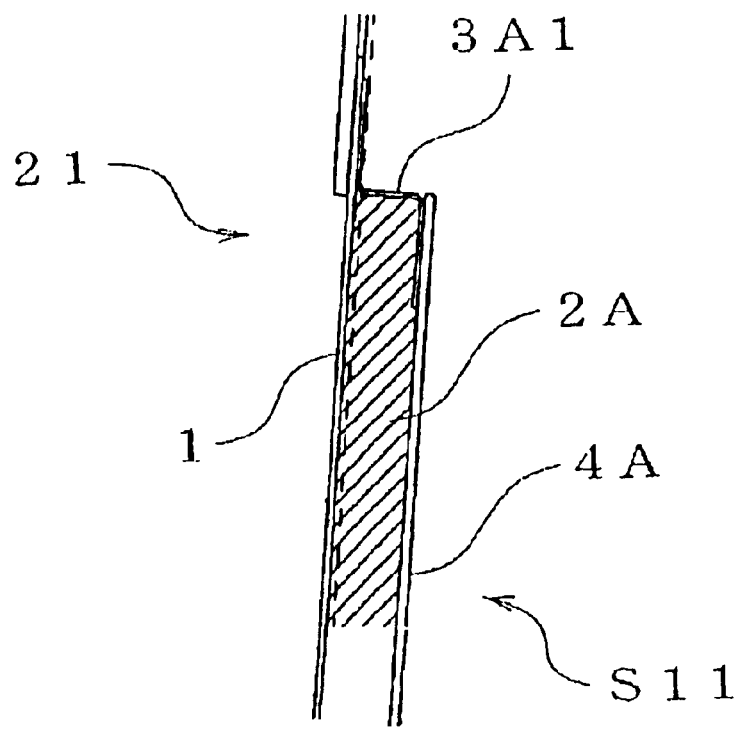
FIG. 28 is an enlarged view of a part E in FIG. 24.
Figure 29:
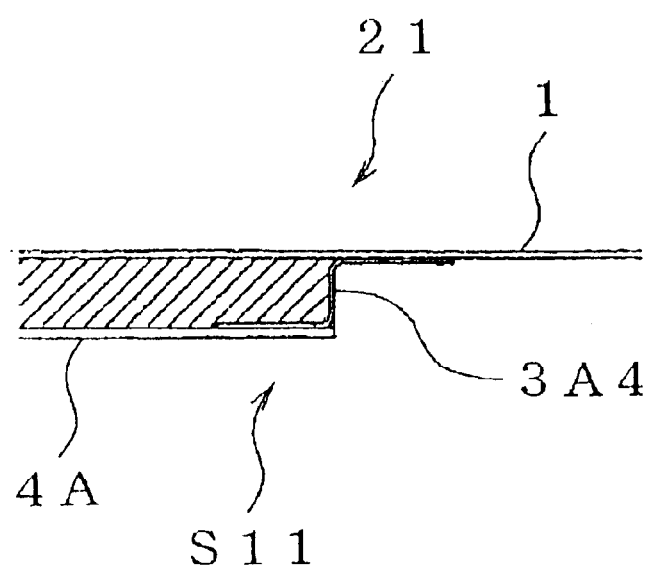
FIG. 29 is an enlarged view of a part F in FIG. 26.
Figure 30:
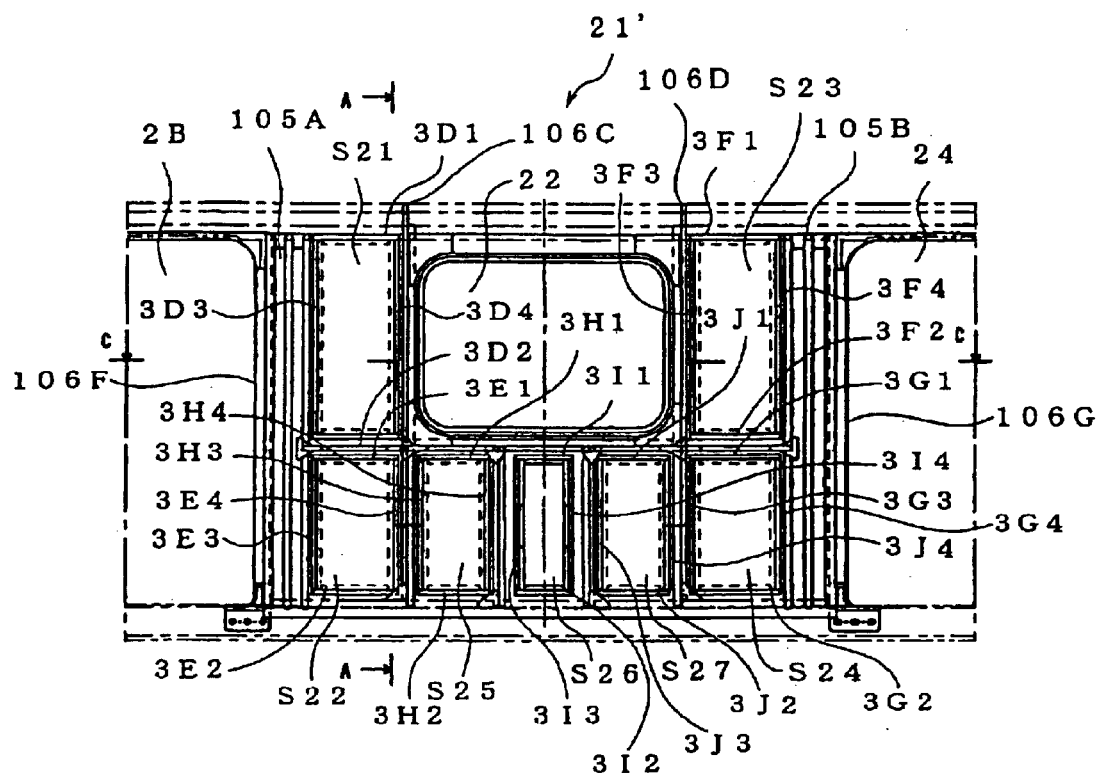
FIG. 30 is a front elevation of another side structure according to the present invention as viewed from the inner side.
Figure 31:
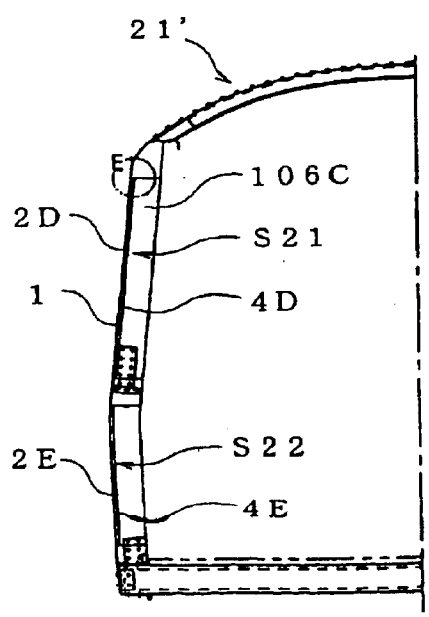
FIG. 31 is a sectional view taken on line A—A in FIG. 30.
Figure 32:
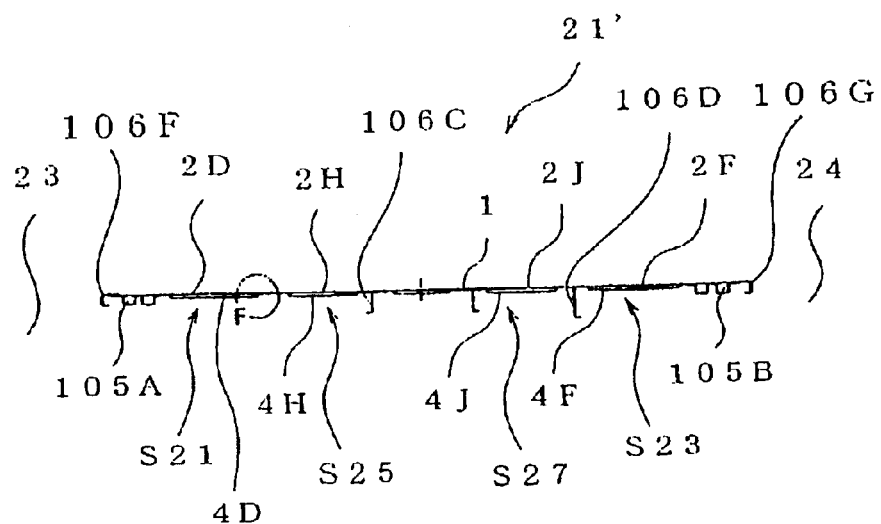
FIG. 32 is a sectional view taken on line C—C in FIG. 30.
Figure 33:
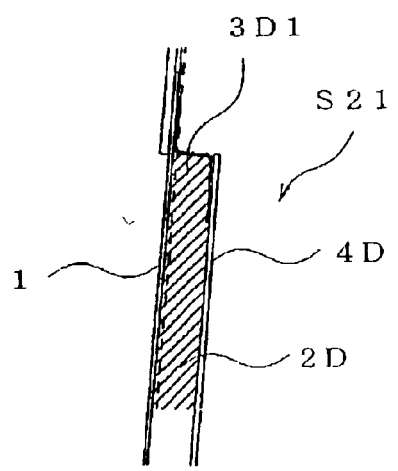
FIG. 33 is an enlarged view of a part E in FIG. 31.
Figure 34:
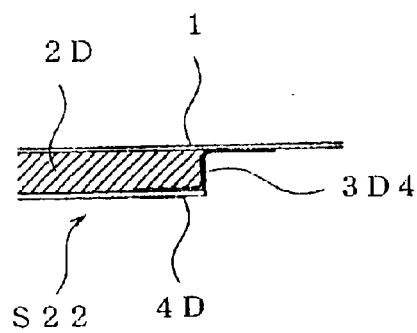
FIG. 34 is an enlarged view of a part F in FIG. 32.
Figure 35:
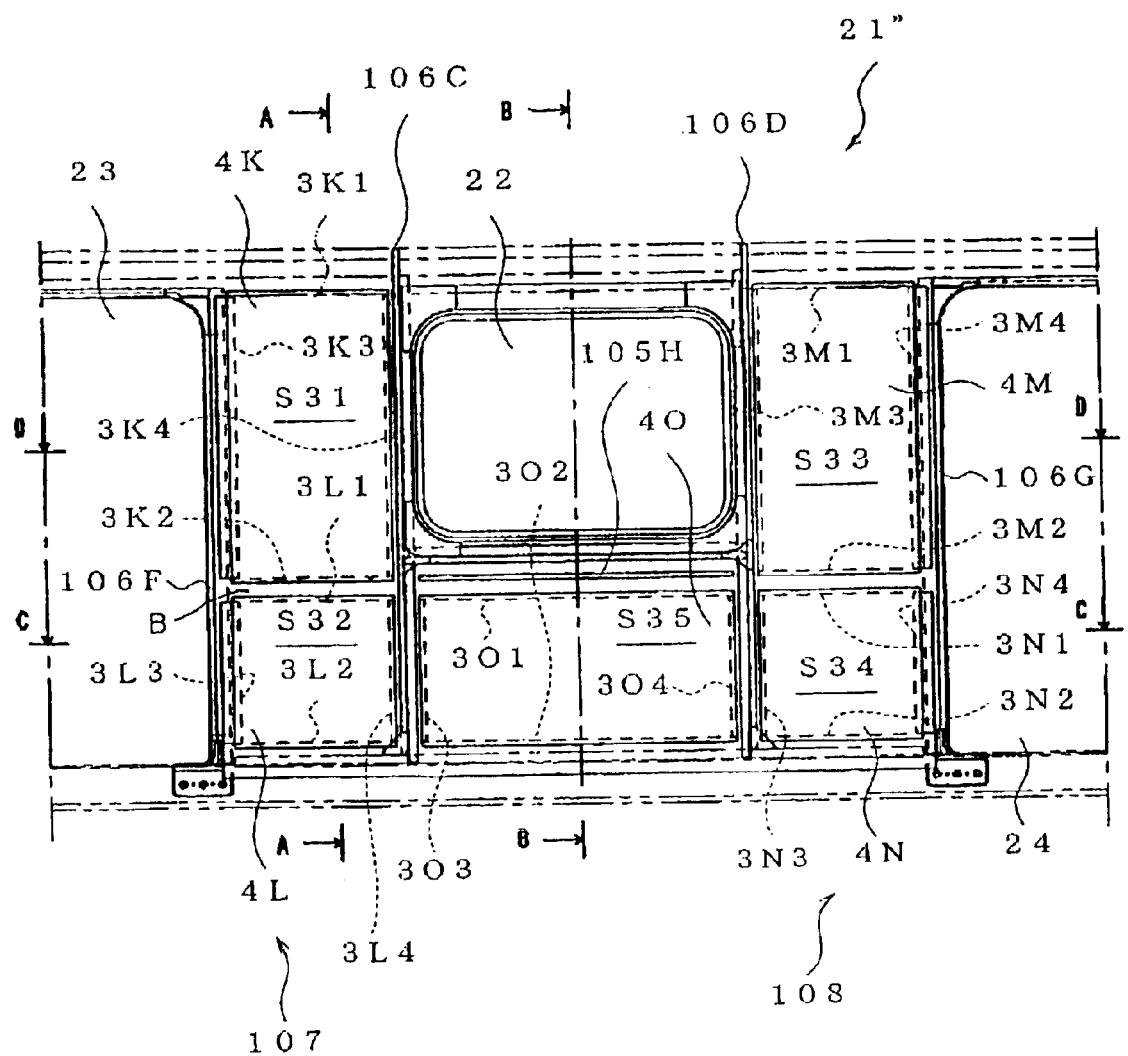
FIG. 35 is a view, similar to FIG. 23, of a third side structure according to the present invention.
Figure 36:
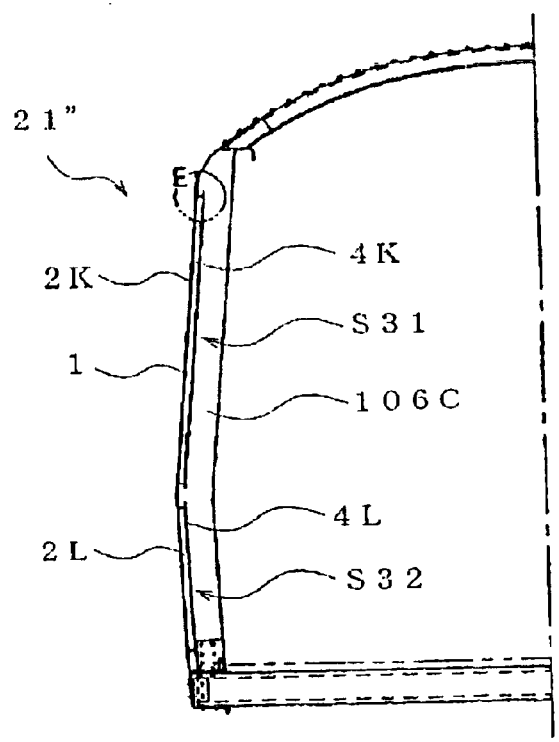
FIG. 36 is a sectional view taken on line A—A in FIG. 35.
Figure 37:
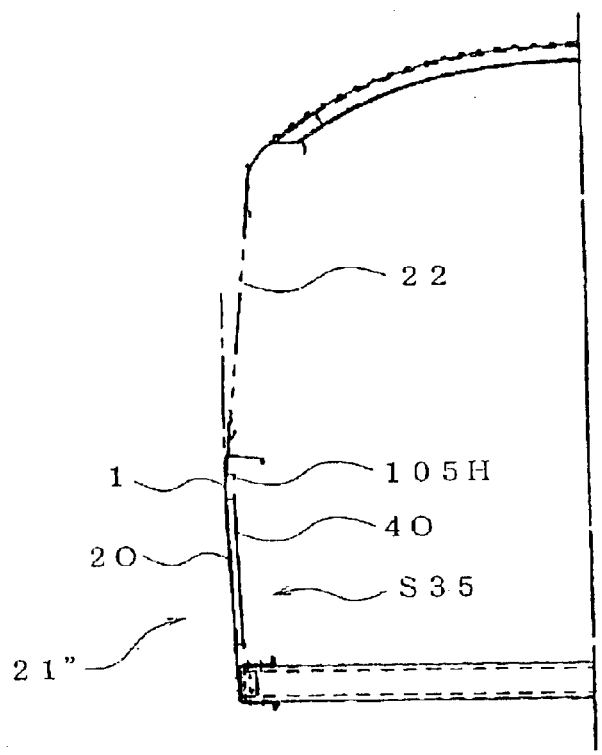
FIG. 37 is a sectional view taken on line B—B in FIG. 35.
Figure 38:
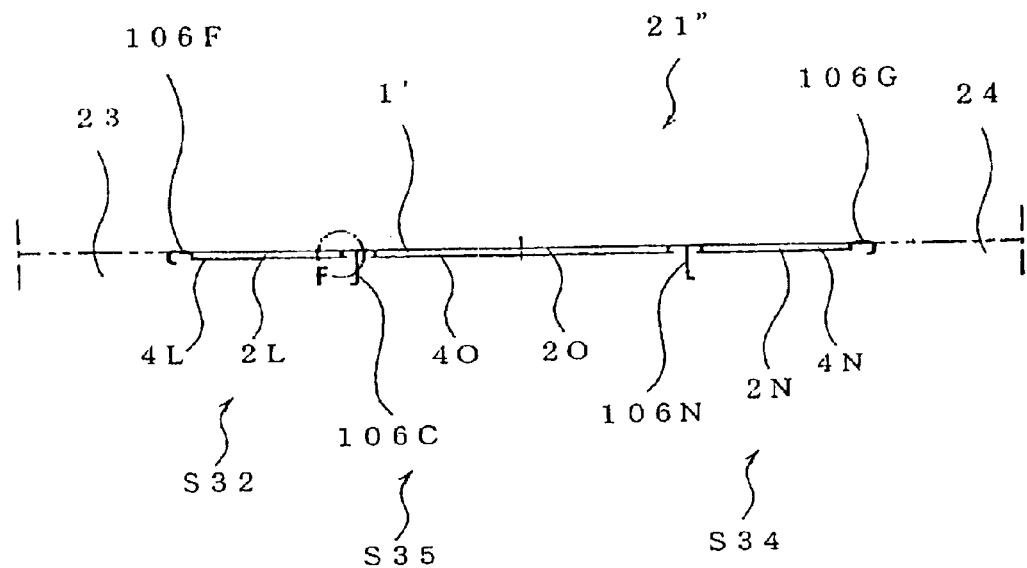
FIG. 38 is a sectional view taken on line C—C in FIG. 35.
Figure 39:
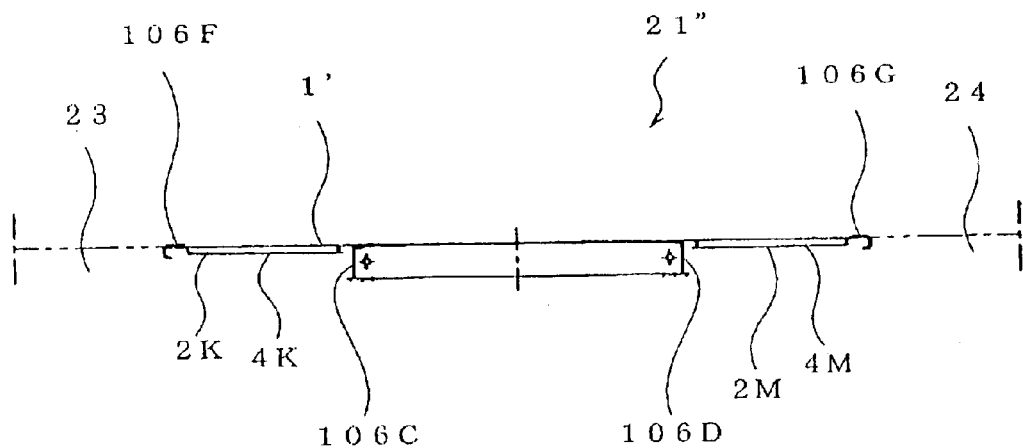
FIG. 39 is a sectional view taken on line D—D in FIG. 35.
Figure 43:
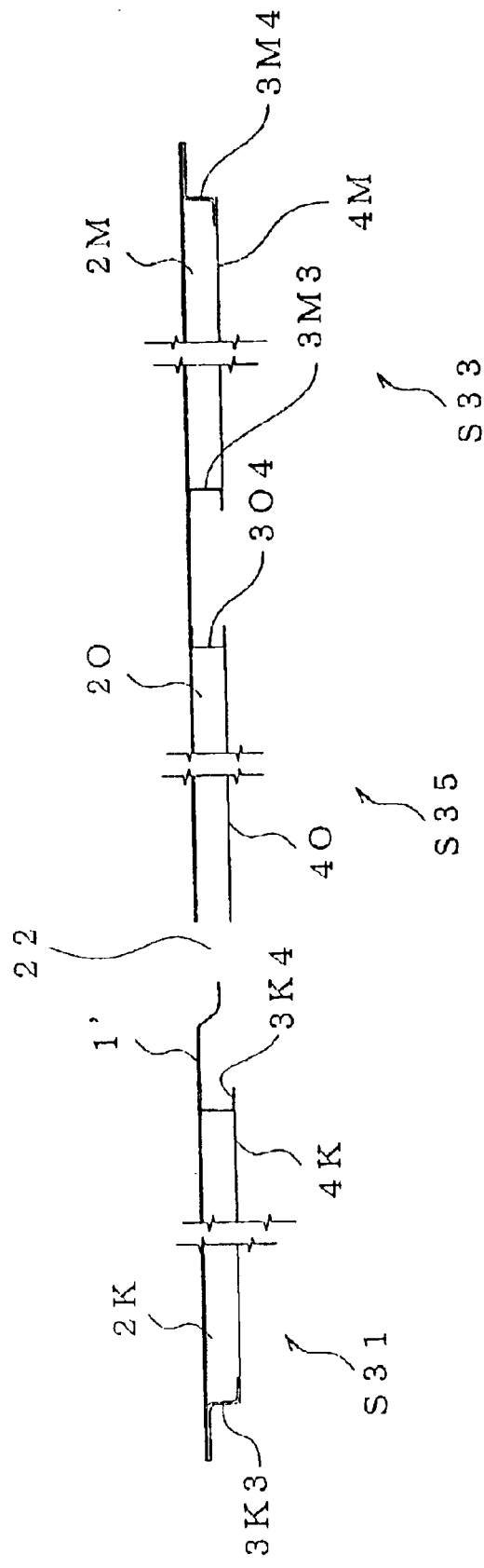
FIG. 43 is a sectional view taken on line A—A in FIG. 42.
Figure 44:
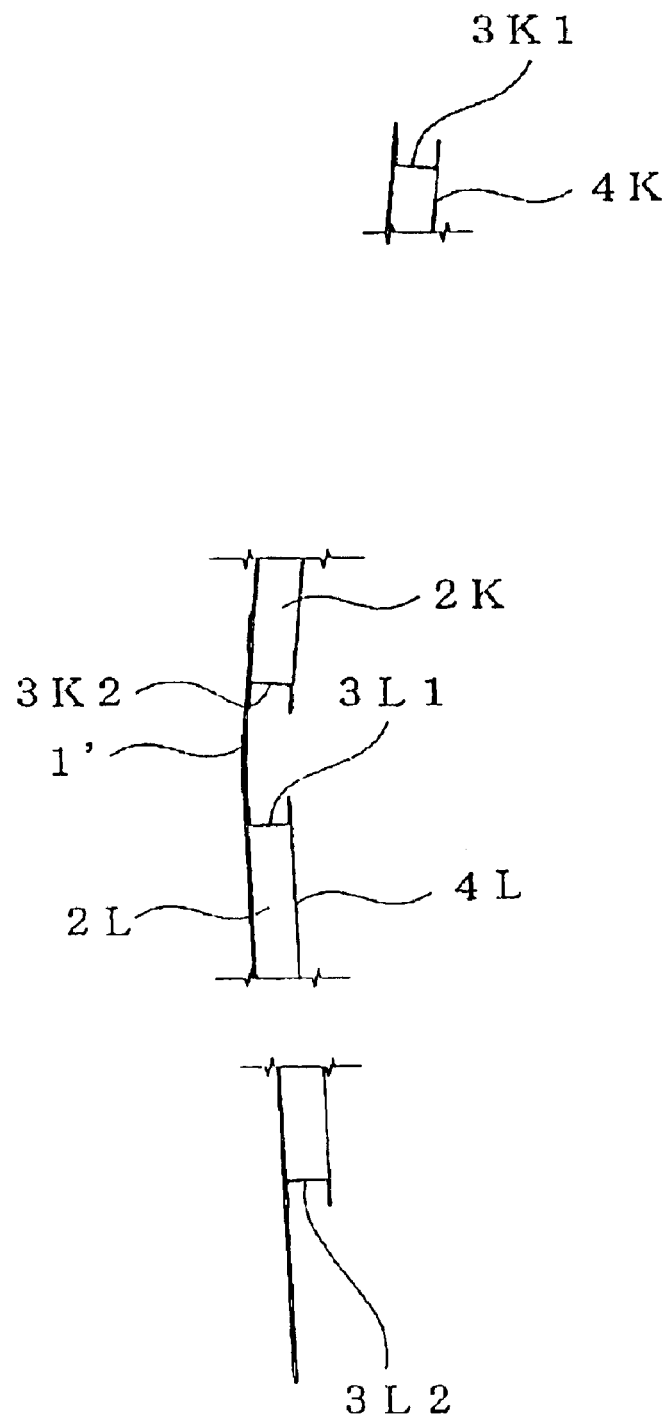
FIG. 44 is a sectional view taken on line B—B in FIG. 42.
Figure 45:
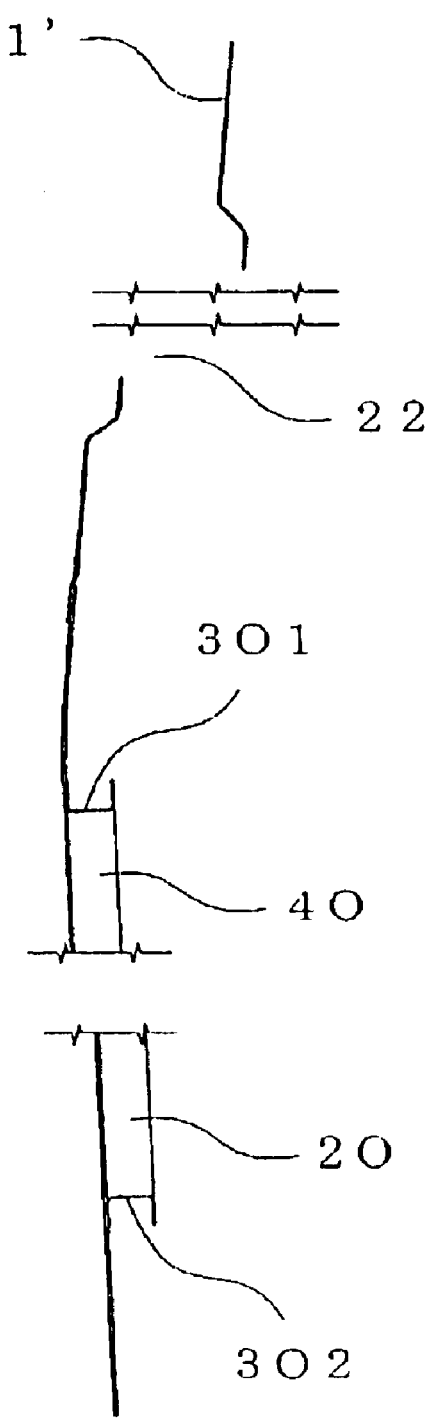
FIG. 45 is a sectional view taken on line C—C in FIG. 42.
Figure 46:
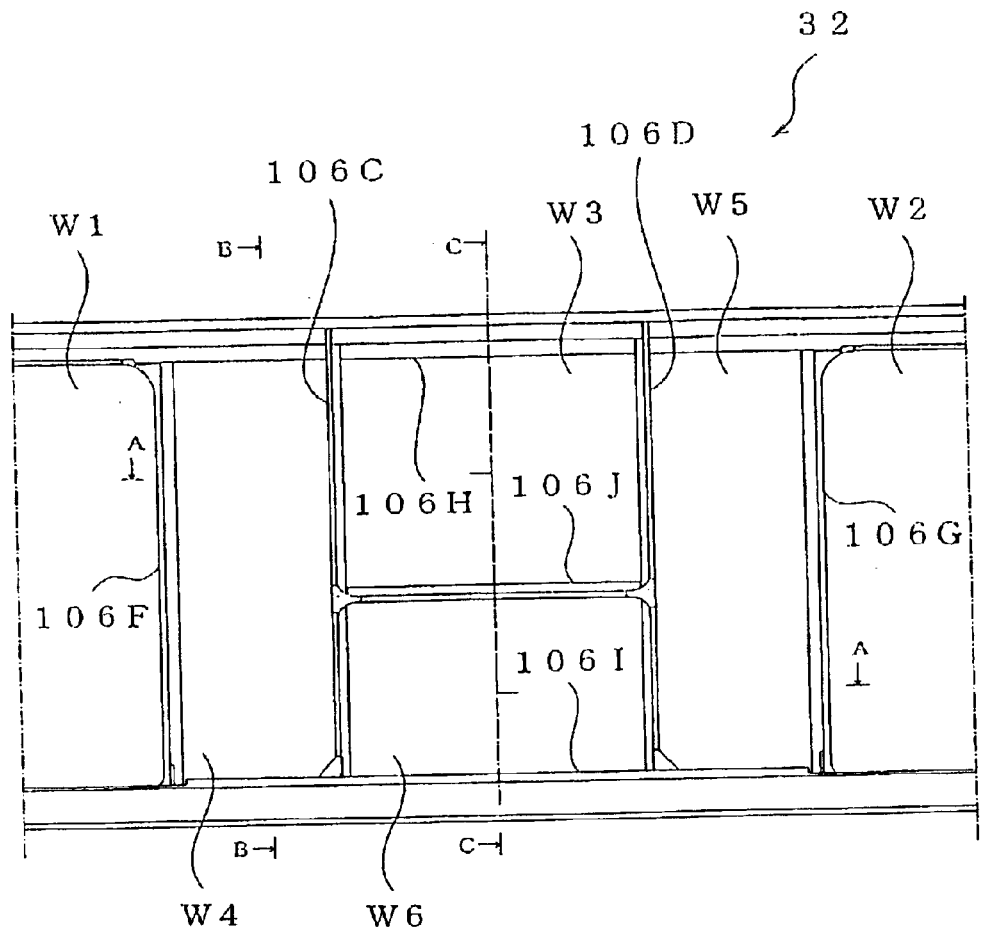
FIG. 46 is a front elevation of a frame element according to the present invention.
Figure 47:
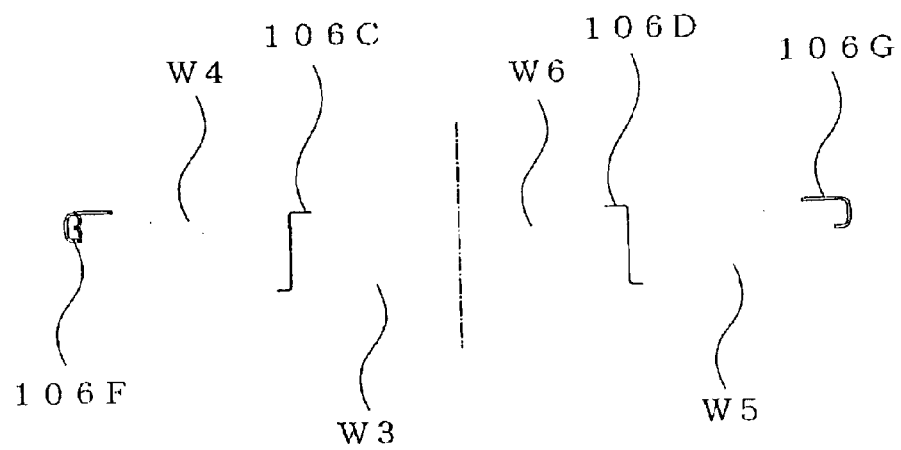
FIG. 47 is a sectional view taken on line A—A in FIG. 46.
Figure 48:
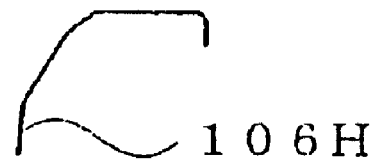
FIG. 48 is a sectional view taken on line B—B in FIG. 46.
Figure 48:
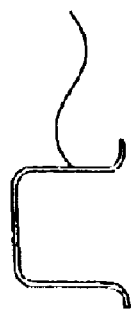
Figure 49:
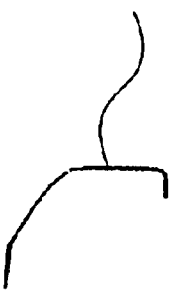
FIG. 49 is a sectional view taken on line C—C in FIG. 46.
Figure 49:
Figure 49:
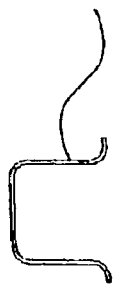
Figure 50:
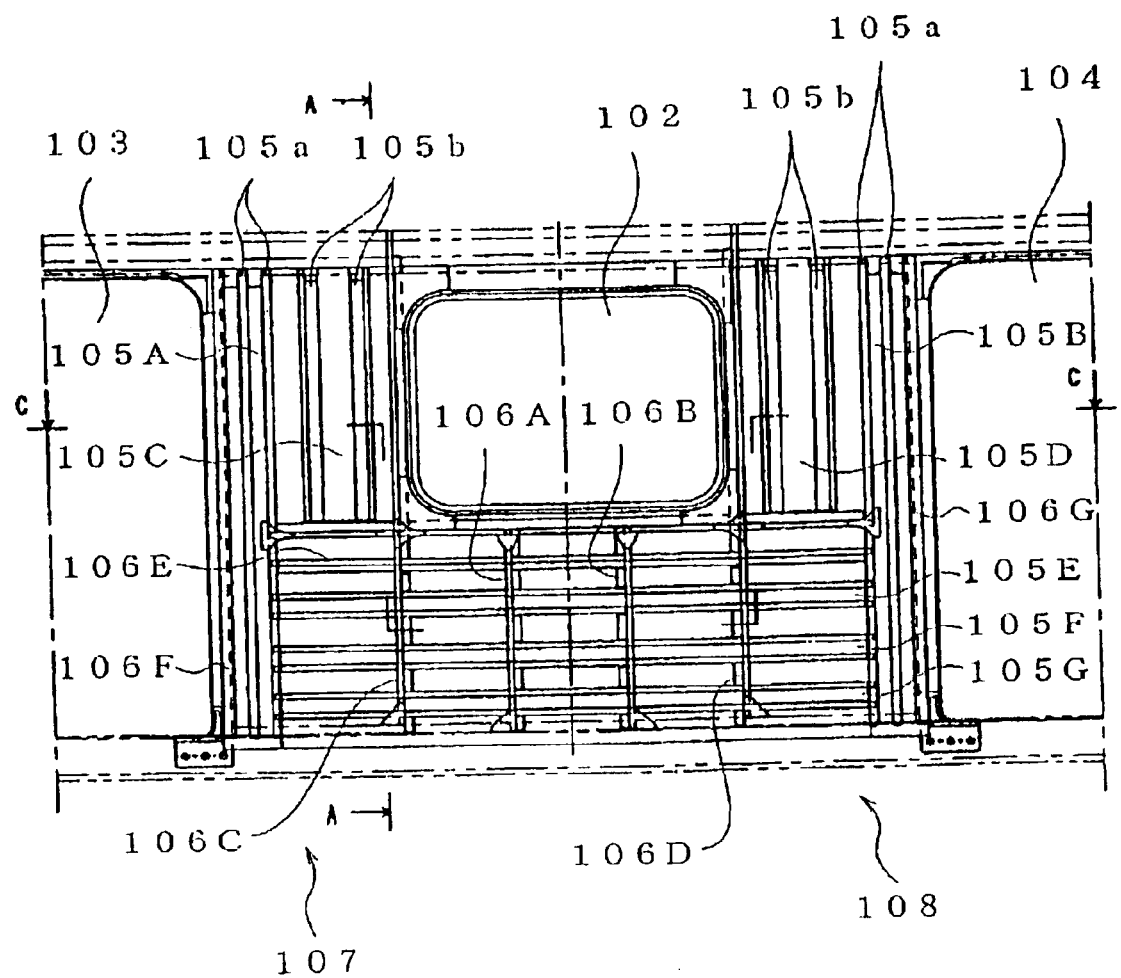
FIG. 50 is a view, similar to FIG. 23, of a conventional side structure.
Figure 51:
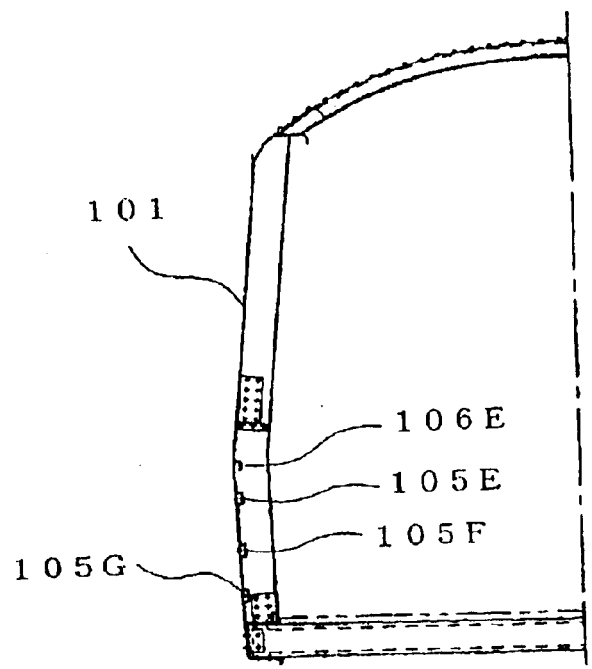
FIG. 51 is a sectional view taken on line A—A in FIG. 50.
Figure 52:
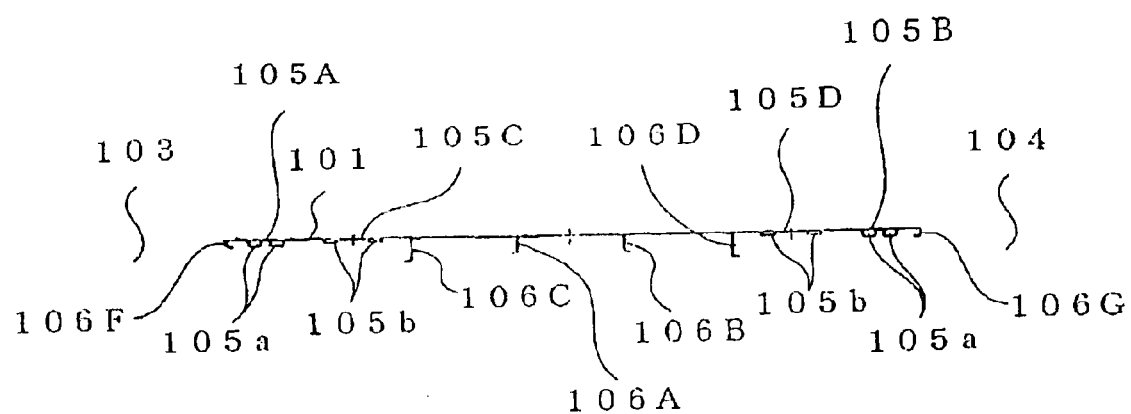
FIG. 52 is a sectional view taken on line C—C in FIG. 50.

Elastic support sections serving as elastic support structures are not limited to those shown in FIG. 23 and may be those shown in FIGS. 30 to 34. A side structure 21' included in a railroad car is provided with an window opening 22, and door openings 23 and 24. The side structure 21' is divided into an upper part and a lower part along a longitudinal line near the lower side of the window opening 22. The upper part of the side structure has a first section S21 and a third section S23, and the lower part of the side structure has a second section S22, fourth section S24, a fifth section S25, a sixth section S26 and a seventh section S27. The three sections S25 to S26 are arranged under the window opening 22.

Each of the sections S21 to S27, similarly to the sections of the side structure in Example 1, has a rectangular shape having longitudinal and vertical sides defined by different rim members. The sections S21 to S27 have a pair of longitudinal rim members 3D1 and 3D2, a pair of longitudinal rim members 3B1 and 3E2, a pair of longitudinal rim members 3F1 and 3F2, a pair of longitudinal rim members 3G1 and 3G2, a pair of longitudinal rim members 3H1 and 3H2, a pair of longitudinal rim members 3I1 and 3I2, and a pair of longitudinal rim members 3J1 and 3J2, respectively. The sections S21 to S27 have a pair of vertical rim members 3D3 and 3D4, a pair of vertical rim members 3E3 and 3E4, a pair of vertical rim members 3F3 and 3F4, a pair of vertical rim members 3G3 and 3G4, a pair of vertical rim members 3H3 and 3H4, a pair of vertical rim members 3I3 and 3I4, and a pair of vertical rim members 3J3 and 3J4, respectively. Inner panels 4D to 4J are bonded adhesively to the rim members 3D1 to 3J1, 3D2 to 3J2, 3D3 to 3J3 and 3D4 to 3J4 to hold cores 2D to 2J on the inner surface of an outer panel 1.

EXAMPLE 3

FIGS. 35 to 41 show elastic support structures, i.e., sections. A first section S31 and a second section S32 are arranged in a vertical arrangement between a window opening 22 and a door opening 23, and a third section S33 and a fourth section S34 are arranged in a vertical arrangement between the window opening 22 and a door opening 24. A part slightly below a middle part with respect to a vertical direction of an outer panel 1' is bent in an outward convex edge B. The first section S31 and the third section S33 are elastic support parts for a portion, extending above the edge B, of the outer panel 1', and the second section S32 and the fourth section S34 are elastic support parts for a portion, extending below the edge B, of the outer panel 1'. Although the part forming the edge B is not elastically supported by a core, the part forming the edge B is curved and hence has a necessary buckling strength.

A fifth section S35 of a width substantially equal to that of the window opening 22 is disposed under the window opening 22. The sections S31 to S35 are structural elements (FIGS. 42 to 45). A side structure 21' is provided with the door openings 23 and 24, and door pockets 107 and 108 on the opposite sides of the window opening 22, respectively. Side posts 106C and 106D and doorway posts 106F and 106G are disposed on boundaries between the those components to form a frame element 32 (FIGS. 46 to 49). The frame element 32 includes, as principal components, vertical frame members 106F, 106C, 106D and 106G (FIG. 35), a longitudinal frame member 106H connecting the upper ends of the vertical frame members, a longitudinal frame member 106I connecting the lower ends of the vertical frame members, and a longitudinal frame member 106J extending between the frame members 106C and 106D. A member indicated at 105H is a reinforcing member.

The frame element 32 has openings not including any frame members such as the frame member 106F and such. The openings include openings W1 and W2 corresponding to the door openings 23 and 24, a third opening W3 corresponding to the window opening 22, a fourth opening W4 corresponding to the first and the second section, a fifth opening W5 corresponding to the third and the fourth section, and a sixth opening W6 corresponding to the fifth section.

Each of the sections S31 to S35 has a rectangular shape having longitudinal and vertical sides defined by different rim members. The sections S31 to S35 have a pair of longitudinal rim members 3K1 and 3K2, a pair of longitudinal rim members 3L1 and 3L2, a pair of longitudinal rim members 3M1 and 3M2, a pair of longitudinal rim members 3N1 and 3N2, and a pair of longitudinal rim members 3O1 and 3O2, respectively. The sections S31 to S35 have a pair of vertical rim members 3K3 and 3K4, a pair of vertical rim members 3L3 and 3L4, a pair of vertical rim members 3M3 and 3M4, a pair of vertical rim members 3N3 and 3N4, and a pair of vertical rim members 3O3 and 3O4, respectively.

The rim members 3K1 to 3O1, 3K2 to 3O2, 3K3 to 3O3 and 3K4 to 3O4 are bonded adhesively to the edges of cores 2K to 2O to hold the cores 2K to 2O on the inner surface of the outer panel 1'. Inner panels 4K to 4O are bonded adhesively to the inner surfaces of the cores 2K to 2O and the rim members 3K1 to 3O1, 3K2 to 3O2, 3K3 to 3O3 and 3K4 to 3O4. The adjacent inner panels 4K to 4O are not connected.

Since cores 2K to 2O are bonded to the inner surface of the outer panel 1' to support the outer panel 1' elastically, the buckling strength of the outer panel 1' is higher than that of the outer panel, not elastically supported, of a conventional body structure.

Thus, the side structure needs less reinforcing members than the conventional side structure. Therefore, welding amount, welding distortion, and spot-welding impressions can be reduced.

Since the sections, i.e., elastic support structures having the cores 2K to 2O, can be determined unconnectedly with the positions of joints in the outer panel, any joints do not need to be formed in the outer panel if the dimensions of the outer panel permits. Consequently, joints can be eliminated from the outer panel. The elimination of joints in the outer panel combined with the reduction of welding amount and welding distortion is effective in improving the appearance of the side structure.

Since the cores 2 (2K to 2O) may be formed of a heat-insulating material, such as a plastic foam, i.e., a lightweight material as compared with the outer panel 1', i.e., a structural member, the side structure is simple in construction and lightweight.

Since the inner panels 4K to 4O are not loaded, the inner panels 4K to 4O may be thinner than the outer panel 1' or may be formed of a lightweight material, such as a fiber-reinforced plastic material or an aluminum alloy, which has an advantageous effect of constructing a lightweight body structure.

The foregoing side structures in Examples 1 and 2, and the conventional side structure as a comparative example will be compared in terms of the weight of reinforcements.

It is assumed that the outer panel is a 1.5 mm thick stainless steel panel, the inner panel is a 0.5 mm thick stainless steel panel, and the cores (plastic foam pads, such as polyurethane foam pads) are 30 mm in thickness.

TABLE 2

|  | Density of core (plastic foam) (kg/m³) | Weight of elastic core (kg) | Weight of 0.5 mm thick stainless steel inner panel (kg) | Weight of stainless steel reinforcement (kg) | Weight of 1.0 mm thick stainless steel rim member | Weight of heat-insulating material (kg) | Total weight (kg) |
|---|---|---|---|---|---|---|---|
| Comparative example | — | — | — | 50.5 kg | — | 6.7 kg | 57.2 kg |
| Example 1 | 50 kg/m³ | 2.9 kg | 7.7 kg | 29.5 kg | 14.0 kg | — | 54.1 kg |
|  | 100 kg/m³ | 5.9 kg | 7.7 kg | 29.5 kg | 14.0 kg | — | 57.1 kg |
|  | 200 kg/m³ | 11.7 kg | 7.7 kg | 29.5 kg | 14.0 kg | — | 62.9 kg |
| Example 2 | 50 kg/m³ | 3.5 kg | 9.1 kg | 29.5 kg | 7.7 kg | — | 49.8 kg |
|  | 100 kg/m³ | 6.9 kg | 9.1 kg | 29.5 kg | 7.7 kg | — | 53.2 kg |
|  | 200 kg/m³ | 13.9 kg | 9.1 kg | 29.5 kg | 7.7 kg | — | 60.2 kg |

It is known from Table 2 that the density of the core has a significant effect on the weight of reinforcements. the density of the plastic foam forming the 30 mm thick cores must be 100 kg/m³ or below to construct a side structure according to the present invention having a weight substantially equal to that of a conventional side structure. Since the mechanical properties of a plastic foam is affected by the density of the plastic form, an optimum density of the plastic foam must be determined.

The smaller the total number of the sections, the higher is the weight efficiency and the less is the number of members. thus, it is considered that the side structure in Example 1 is preferable to the side structure in Example 2.

The side structure in Example 3 and the conventional side structure as a comparative example will be compared in terms of the weight of reinforcements.

It is assumed that, in the side structure in Example 3, the outer panel is a 1.5 mm thick stainless steel panel, the inner panel is a 0.5 mm thick stainless steel panel, the cores (plastic foam pads, such as polyurethane foam pads) are 30 mm in thickness, and the side structure is-not provided with any members corresponding to the reinforcing members 105A and 105B of the side structures in Examples 1 and 2.

According to the present invention, cores are bonded adhesively to the inner surface of an outer panel, inner panels are bonded adhesively to the cores so as to cover the cores, and the outer panel is supported elastically by connecting the outer and the inner panel by rim members. Therefore, the outer panel is able to secure a necessary buckling strength even if any reinforcing members are not welded thereto. Thus, the present invention has advantageous effect of reducing the number of reinforcements, reducing the amount of welding necessary for welding reinforcements to the outer panel and reducing welding distortion.

The cores of the present invention are lightweight structural members. A lightweight structure can be constructed by properly selectively determining the pitches of the rim members, the thickness of the cores and the density of the material of the cores. Since the cores are formed of a plastic foam having a heat-insulating capability, a heat-insulating effect is available and the construction is simplified by effectively using spaces between the outer and the inner panel.

Since the inner panel is not loaded, the inner panels may be thinner than the outer panel or may be formed of a lightweight material, such as a fiber-reinforced plastic mate-

TABLE 3

|  | Density of core (plastic foam) (kg/m³) | Weight of elastic core (kg) | Weight of 0.5 mm thick stainless steel inner panel (kg) | Weight of stainless steel reinforcement (kg) | Weight of 1.0 mm thick stainless steel rim member | Weight of heat-insulating material (kg) | Total weight (kg) |
|---|---|---|---|---|---|---|---|
| Comparative example | — | — | — | 50.5 kg | — | 6.7 kg | 57.2 kg |
| Example 3 | 50 kg/m3 | 4.50 kg | 12.8 kg | 0.7 kg | 9.1 kg | — | 27.1 kg |
|  | 100 kg/m³ | 18.0 kg | 12.8 kg | 0.7 kg | 9.1 kg | — | 31.6 kg |
|  | 200 kg/m³ | 11.7 kg | 7.7 kg | 0.7 kg | 9.1 kg | — | 40.6 kg |

It is known from Table 3 that the density of the core has a significant effect on the weight of reinforcements.

Even if the cores are formed of a plastic foam having a high density of 200 kg/m³, the weight of the side structure of the present invention is lighter than the conventional side structure.

Although the invention has been described as applied to a monocoque structure analogous with the body structure of a railroad car, the present invention is not limited thereto in its practical application. The present invention is applicable also to, for example, fuselages of aircraft.

As apparent from the foregoing description, the present invention has the following effects.

rial or an aluminum alloy, which provides an advantageous effect of constructing a lightweight structure and reducing the weight of the structure.

The use of the rim members formed of a fiber-reinforced plastic material, an aluminum alloy or a stainless steel plate thinner than the outer panel, and forming the outer panel of a metal, such as an aluminum alloy or a stainless steel, reduces the weight of the structure.

A body structure includes the foregoing structural element, and the frame element formed by arranging and joining longitudinal and vertical frame members that reinforce the body structure, the sections including the inner panels of the structural element are placed in openings in the frame element, the rim members are disposed at the least possible distance from the frame members, and the thickness of the frame members of the frame element is greater than that of the rim members. Thus, parts of the outer panel required to have a necessary buckling strength can secure the necessary buckling strength by adhesively bonding the cores, the rim members and the inner panels to the inner surfaces of those parts of the outer panel to form elastic support structures using the elasticity of the cores. Since any joints do not need to be formed in parts of the outer panel corresponding to the boundaries of the sections, welding amount and welding distortion can be reduced and the appearance of the body structure can be improved.

Thus, window openings and doorway openings can be easily formed by leaving some of the openings of the frame element not covered with the structural element.

When the outer panel of the structural element has an outward convex bend, separate cores are used, cores may be those having the shape of a flat plate and linear rim members can be used, which facilitates the manufacture of the body structure.

When the distance b between the frame member of the frame element, and the rim member of the structural element meets the condition specified by the present invention, a part of the outer panel between the frame member of the frame element and the rim member of the structural element is able to secure necessary buckling strengths with respect to a direction parallel to the frame member and a direction perpendicular to the frame member.

What is claimed is:

1. A body structure, comprising:
   a structural element to be combined with other structural members to construct the body structure, comprising:
   an outer panel serving as a structural member;
   inner panels respectively having areas smaller than that of the outer panel;
   rim members interposed between the outer panel and the inner panels, and joined to the outer panel and the inner panels; and
   core members filling up spaces defined by the outer panel, the inner panels and the rim members,
   the core members lying between the outer panel and the inner panels, and being adhesively bonded or welded at least to the outer and the inner panels; and
   a frame element having reinforcing frame members arranged on the outer panel in longitudinal and transverse directions,
   wherein each of the inner panels, the rim members corresponding to each of the inner panels and the core member corresponding to each of the inner panels are provided within an area between the adjacent reinforcing frame members to enhance buckling strength of a part of the outer panel between the adjacent reinforcing frame members.

2. The body structure according to claim 1, wherein the core member is formed of a plastic foam or wood functioning as heat-insulating material.

3. The body structure according to claim 1, wherein the inner panels are each a structural member of a fiber-reinforced plastic material or an aluminum alloy, or a stainless steel panel of a thickness not greater than ⅓ of the thickness of the outer panel.

4. The body structure according to claim 1, wherein the rim members are each a structural member formed of a fiber-reinforced plastic material or an aluminum alloy, or a stainless steel plate thinner than the outer panel.

5. The body structure according to claim 1, wherein the outer panel is formed of an aluminum alloy or a stainless steel.

6. The body structure according to claim 1, wherein sections of the inner panels of the structural element are placed in openings in the frame element, respectively.

7. The body structure according to claim 6, wherein one of the openings of the frame element of is not covered with the structural element and is used as a window opening.

8. The body structure according to claim 6, wherein one of the openings of the frame element is not covered with the structural element and are used as a doorway opening.

9. The body structure according to claim 6, wherein the outer panel of the structural element has an outward convex bend, elastic support parts each including the core member, the rim members and the inner panel are arranged separately and are demarcated by the outward convex bend.

10. The body structure according to claim 6, wherein a distance b between a frame member of the frame element, and a rim member of the structural element adjacent and parallel to the frame member, meets Expression (1):

$$b \leq t\sqrt{\frac{\pi^2 E}{3(1-v^2)\sigma_{c1}}} \quad (1)$$

t: Thickness of the outer panel
π: Ratio of the circumference of a circle to its diameter,
E: Young's modulus of the outer panel,
v: Poisson's ratio of the outer panel, and
$\sigma_{c1}$: Compressive stress parallel to the frame member induced in a part of the outer panel between the frame member and the rim member of the structural element parallel to the frame member when the body structure is loaded.

11. The body structure according to claim 6, wherein a distance b between the frame member of the frame element, and the rim member of the structural element adjacent and parallel to the frame member, meets Expression (2):

$$b \leq t\sqrt{\frac{\pi^2 E}{12\sigma_{c2}}} \quad (2)$$

t: Thickness of the outer panel
π: Ratio of the circumference of a circle to its diameter
E: Young's modulus of the outer panel
v: Poisson's ratio of the outer panel
$\sigma_{c2}$: Compressive stress in a direction perpendicular to a frame member induced in a part of the outer panel between the frame member of the frame element and a rim member of the structural element adjacent and parallel to the frame member when the body structure is loaded.

* * * * *